(12) United States Patent
Marquardt et al.

(10) Patent No.: US 10,372,403 B2
(45) Date of Patent: Aug. 6, 2019

(54) MULTI-USER DISPLAY COLLABORATION SYSTEM

(71) Applicant: Dell Products L.P., Round Rock, TX (US)

(72) Inventors: Joseph Paul Marquardt, Menlo Park, CA (US); Neil Hand, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 15/266,376

(22) Filed: Sep. 15, 2016

(65) Prior Publication Data

US 2018/0074779 A1   Mar. 15, 2018

(51) Int. Cl.

| | | |
|---|---|---|
| *G09G 5/00* | (2006.01) | |
| *G06F 3/14* | (2006.01) | |
| *H04L 29/08* | (2006.01) | |
| *G06F 3/00* | (2006.01) | |
| *H04L 29/06* | (2006.01) | |

(52) U.S. Cl.
CPC .............. *G06F 3/1454* (2013.01); *G06F 3/00* (2013.01); *H04L 67/14* (2013.01); *H04L 67/38* (2013.01); *G09G 2354/00* (2013.01)

(58) Field of Classification Search
CPC ....... H04L 67/104; H04L 41/22; H04L 43/08; H04L 65/4015; H04L 65/60; H04L 67/10; H04L 67/14; H04L 67/141; H04L 67/303; H04W 40/244; H04W 4/80; H04W 76/10; H04W 76/14; H04W 80/00; G06F 3/1454
See application file for complete search history.

(56) References Cited

U.S. PATENT DOCUMENTS

| | | | |
|---|---|---|---|
| 2015/0163788 A1* | 6/2015 | Karunakaran | H04W 56/001 370/254 |
| 2015/0264138 A1* | 9/2015 | Watts, Jr. | H04L 67/1095 709/203 |

* cited by examiner

*Primary Examiner* — Insa Sadio
(74) *Attorney, Agent, or Firm* — Haynes and Boone, LLP

(57) ABSTRACT

A multi-user display collaboration system includes a plurality of source devices that each include a respective source device display screen, a display device, and a sink device coupled to each of the plurality of source devices and the display device. The sink device receives first collaboration information that is stored on the first source device and displayed on a first source device display screen of the first source device, and displays the first collaboration information on the display device. The sink device then receives a first input instruction from a second source device that is directed to the first collaboration information displayed on the display device; and causes the first input instruction to be executed on the first collaboration information that is displayed on the display device.

18 Claims, 18 Drawing Sheets

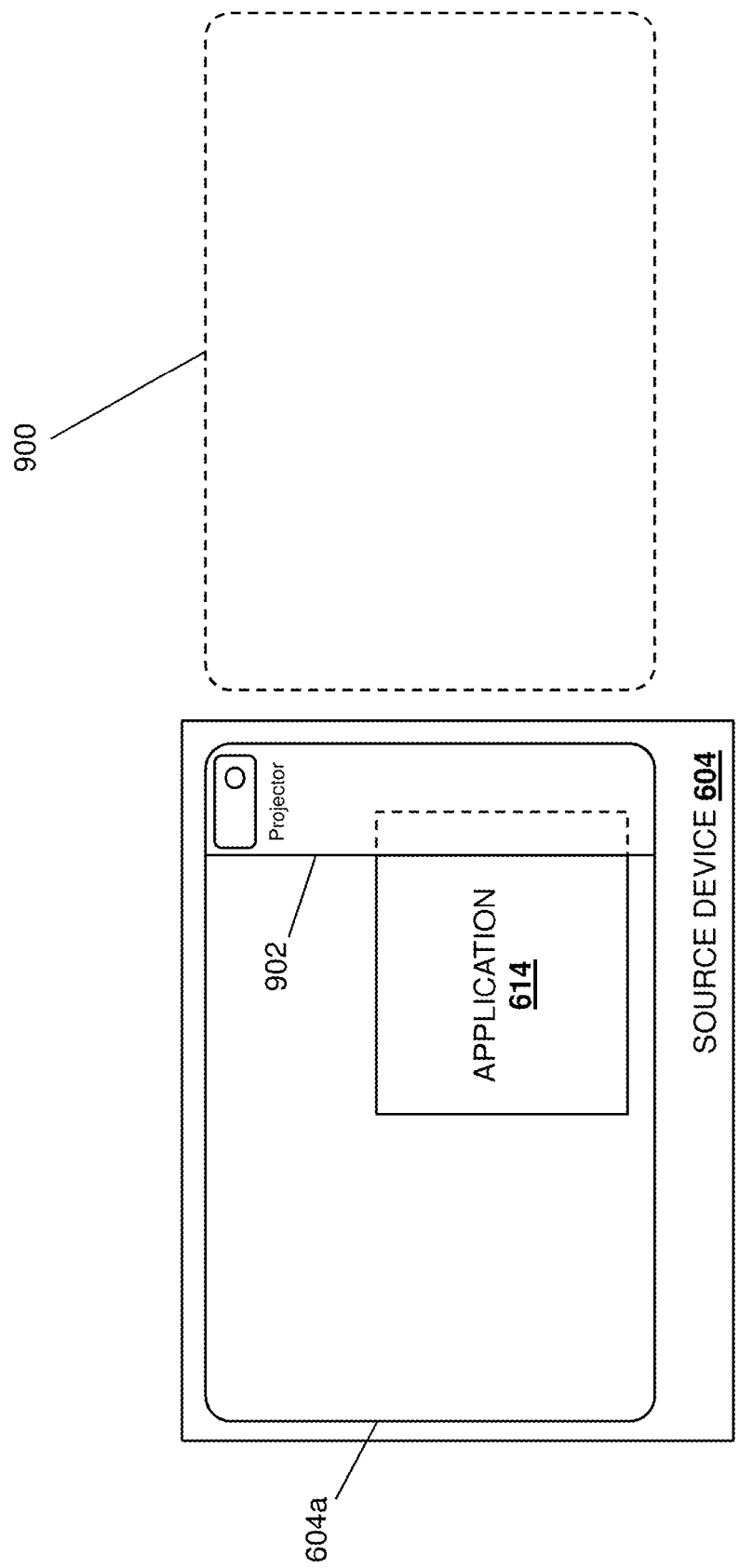

MULTI-USER DISPLAY COLLABORATION SYSTEM

BACKGROUND

The present disclosure relates generally to information handling systems, and more particularly to a display collaboration system for multiple users using respective information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes used by users to collaborate on various projects. For example, information handling systems such as laptop/notebook computing devices may be utilized to provide collaboration information for display on a display device of the laptop/notebook computing system. However, most laptop/notebook computing device are provided with display devices that include relatively small screens that are configured for viewing by their user, and thus the provision of collaboration information on the screen of those display devices introduces difficulties with regard to collaboration as users may need to each position themselves in the limited area in front of the screen on the display device in order to view the collaboration information. Conventional solutions to this problem have included systems that enable the "sharing" of the collaboration information that is provided on the screen of the display device of the laptop/notebook computing device on a separate (and typically larger) display device. For example, a user that wishes to collaborate with other users using collaboration information on the laptop/notebook computing device may share that collaboration information that is displayed on the screen of the display device of the laptop/notebook computing device with projector that projects that collaboration information on a screen that is larger than the screen on the display device of that laptop/notebook computing device, or a television computing device that displays that collaboration information on a "secondary" display screen that is larger than the screen of the display device on the laptop/notebook computing device.

However, while such solutions allow each of the collaborating users to view collaboration information provided by any given user relatively easily, they are still limited in enabling collaboration, as only a single information handling system may "share" its collaboration information on the separate, larger screen at any given time, and manipulation of the collaboration information that is being displayed on that separate, larger screen requires control of the information handling system that is "sharing" that collaboration information. As such, conventional multi-user display collaboration systems require all the collaboration information that is to be viewed on the separate, larger screen to be provided on a particular information handling system prior to collaborating, control of that information handling system to be passed between users to manipulate the collaboration information (e.g., by physically passing the information handling system between the users, having the user that wishes to manipulate the collaboration information move to the information handling system, etc.), and the sending of any finalized collaboration information by the user of that information handling system to the other users that wish to have a copy of that finalized collaboration information.

Accordingly, it would be desirable to provide an improved multi-user display collaboration system.

SUMMARY

According to one embodiment, an information handling system (IHS) includes a display device connector; a processing system that is coupled to the display device connector; and a memory system that is coupled to the processing system and that includes instruction that, when executed by the processing system, cause the processing system to provide a display engine that is configured to: receive, from a first source device, first collaboration information that is stored on the first source device and displayed on a first source device display screen of the first source device; display the first collaboration information on a display device that is coupled to the display device connector; receive, from a second source device, a first input instruction that is directed to the first collaboration information displayed on the display device; and cause the first input instruction to be executed on the first collaboration information that is displayed on the display device.

BRIEF DESCRIPTION OF THE DRAWINGS

FIG. 9a is a schematic view illustrating an embodiment of a source device in the multi-user display collaboration system along with a virtual display screen provided by a sink device in the multi-user collaboration system of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
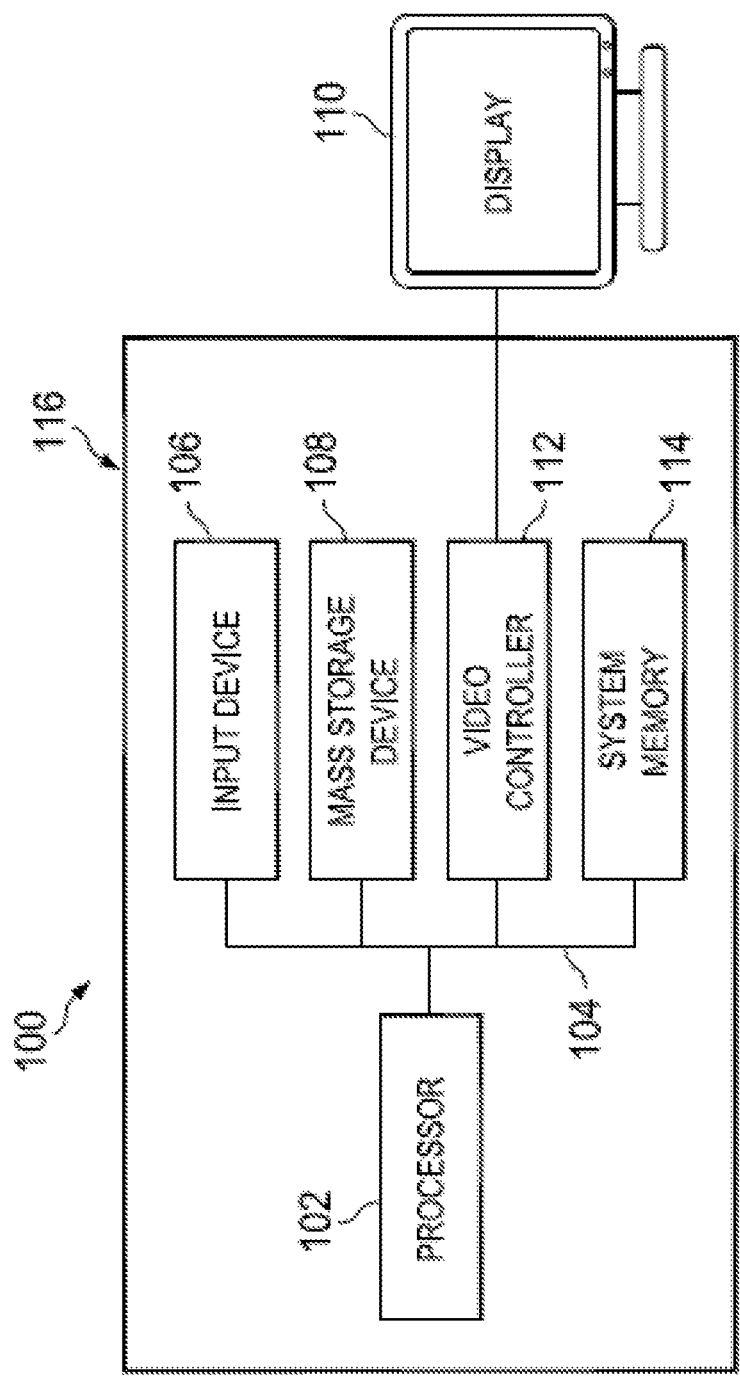
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
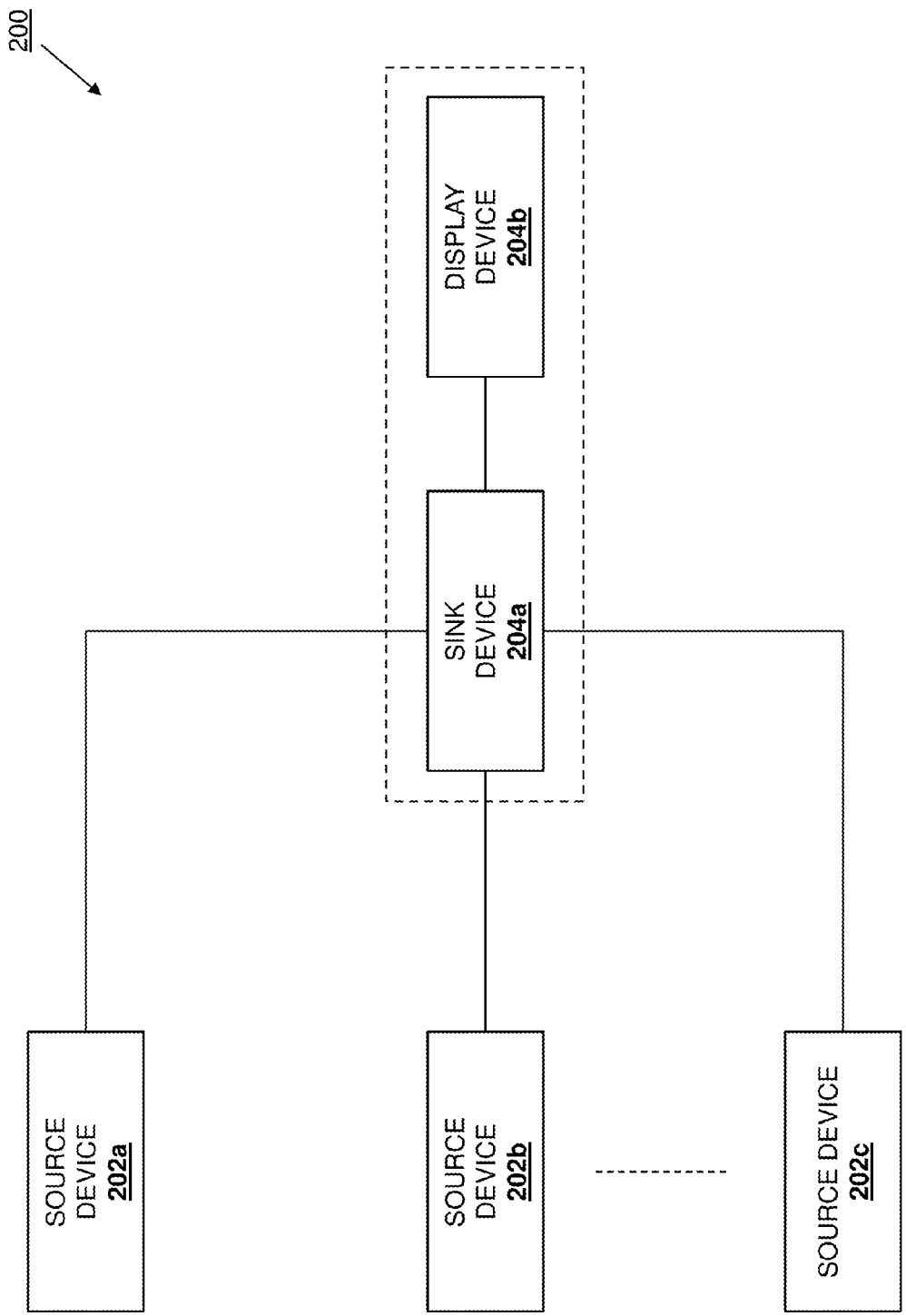
FIG. 2 is a schematic view illustrating an embodiment of a multi-user display collaboration system.

Referring now to FIG. 2, an embodiment of a multi-user display collaboration system 200 is illustrated that includes a plurality of source devices 202a, 202b, and up to 202c. In an embodiment, any or all of the source devices 202a-c may be the IHS 100 discussed above with reference to FIG. 1, and/or may include some or all of the components of the IHS 100. In the examples discussed below, the source devices 202a-c are described as mobile computing devices such as laptop/notebook computer devices, tablet computing devices, and mobile phones. However, in other embodiments, the source devices 202a-c may be provided by desktop computing devices, server computing devices, and/or a variety of other computing devices that would be apparent to one of skill in the art in possession of the present disclosure. Each of the plurality of source devices 202a-c are coupled to a sink device 204a. In an embodiment, the sink device 204a may be the IHS 100 discussed above with reference to FIG. 1, and/or may include some or all of the components of the IHS 100. In the examples discussed below, the sink device 204a is described as a shared display system such as projector computing system, a dongle computing system (e.g., including a GOOGLE® CHROMECAST® dongle computing device, an AMAZON® FIRE TV STICK® dongle computing device, etc.), a television display system, a content management display system (e.g., including an APPLE TV® content management system), and other shared display systems know in the art. However, in other embodiments, the sink device 204a may be provided by a variety of other computing devices that include display screens that may be utilized by the source devices 202*a-c* as would be apparent to one of skill in the art in possession of the present disclosure.

In an embodiment, the coupling between the source devices 202*a-c* and the sink device 204*a* is a communicative coupling that provides for the transmission of collaboration information and other data between each of the source devices 202*a-c* and the sink device 204*a* for display. In the examples discussed below, the couplings between the source devices 202*a-c* and the sink device 204*a* are described as wireless couplings provided by wireless communication subsystems that may include WiFi communication subsystems, BLUETOOTH® communication subsystems, and/or other wireless communication subsystems known in the art. However, in other embodiments, the couplings between any or all of the source devices 202*a-c* and the sink device may be provided by wired connections, combined wireless/wired connections, and/or any other coupling that is configured to transmit the data as discussed below.

The sink device 204*a* is coupled to a display device 204*b*. In some embodiments, the sink device 204*a* and the display device 204*b* may be separate components such as, for example, the projector computing device/sink device and projector screen/display device, the dongle computing device and display device, and/or the content management computing device discussed below. However, in other embodiments, the sink device 204*a* and the display device 204*b* may be an integrated component (as illustrated by the dashed line in FIG. 2) such as, for example, the television display device and/or other computing devices discussed below. As such, the coupling between the sink device 204*a* and the display device 204*b* that is illustrated in FIG. 2 need not be a physical coupling, but rather may be provided by positioning the sink device 204*a* appropriately relative to the display device 204*b* (e.g., as with a projector computing device/sink device positioned appropriately to provide images on a projector screen/display device). However, in some embodiments, the coupling between the sink device 204*a* and the display device 204*b* that is illustrated in FIG. 2 may be a physical external coupling such as a cable between the sink device 204*a* and the display device 204*b* (as is used with content management display systems), or a mated connection between the sink device 204*a* and the display device 204*b* (as is used with dongle computing systems). Furthermore, in some embodiments, the coupling between the sink device 204*a* and the display device 204*b* that is illustrated in FIG. 2 may be a physical internal coupling such as a coupling provided between a processing system and a display subsystem in a television display device and/or other computing device. Thus, while a specific embodiment of the multi-user display collaboration system 200 is illustrated and described herein, one of skill in the art in possession of the present disclosure will recognize that a wide variety of modification to the components and configuration of the multi-user display collaboration system 200 will fall within the scope of the present disclosure.

Figure 3:
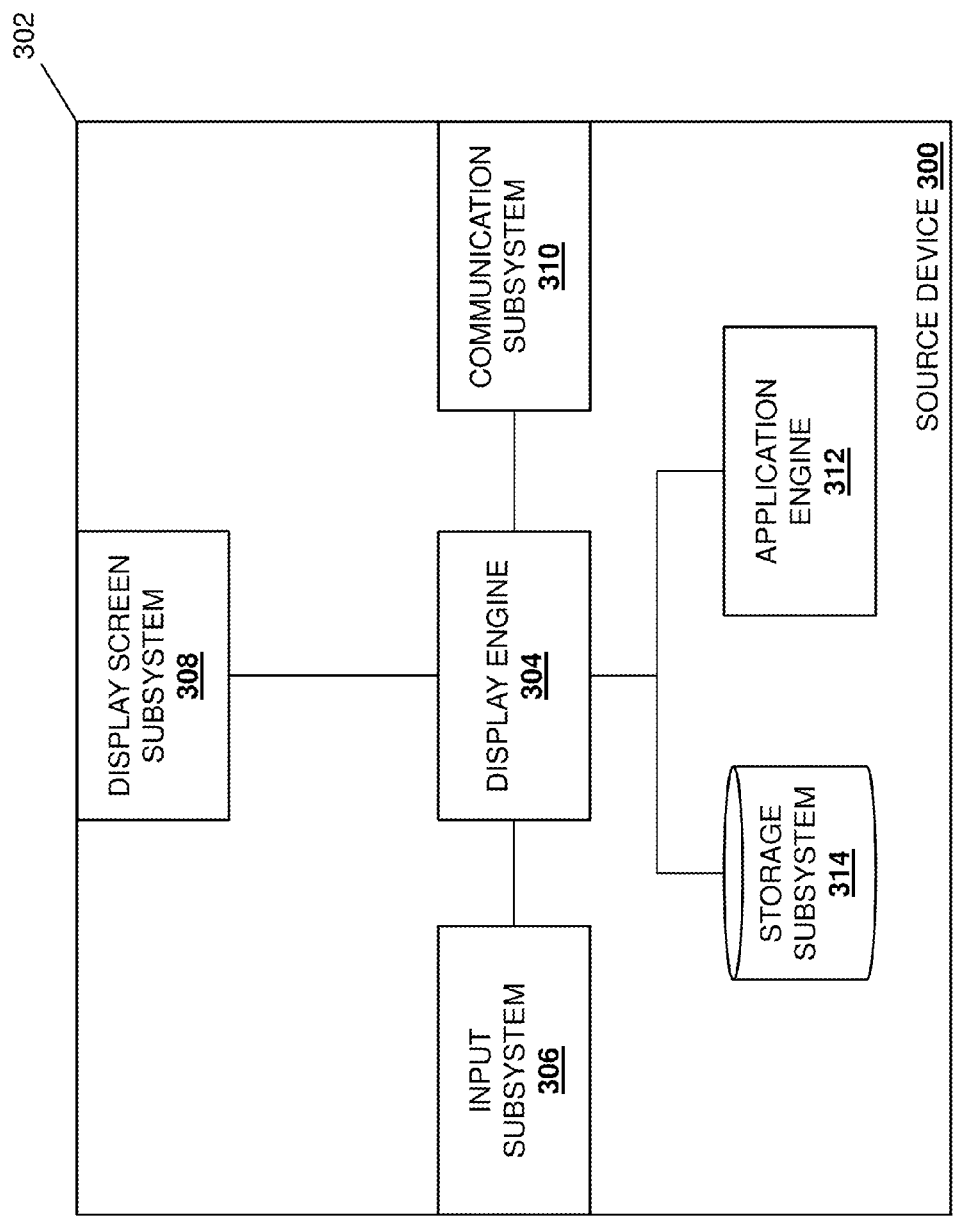
FIG. 3 is a schematic view illustrating an embodiment of a source device used in the multi-user display collaboration system of FIG. 2.

Referring now to FIG. 3, an embodiment of a source device 300 is illustrated that may be any of the source device 202*a-c* discussed above with reference to FIG. 2. As such, the source device 300 may be the IHS 100 discussed above with reference to FIG. 1, and/or may include some or all of the components of the IHS 100. As discussed above, while the source device 300 is described below as a mobile computing device such as a laptop/notebook computer device, tablet computing device, and mobile phone, the source device 300 may be provided by desktop computing devices, server computing devices, and/or a variety of other computing devices that would be apparent to one of skill in the art in possession of the present disclosure. In the illustrated embodiment, the source device 300 includes a chassis 302 that houses the components of the source device 300, only some of which are illustrated in FIG. 3. For example, the chassis 302 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a display engine 304 that is configured to perform the functions of the display engines and source devices discussed below. In a specific example, the processing system may include a graphics processing unit (GPU) that is configured to render collaboration information for display as discussed below.

The chassis 302 also houses an input subsystem 306 that is coupled to the display engine 304 (e.g., via a coupling between the processing system and the input subsystem 306). In an embodiment, the input subsystem 306 may be provided by a keyboard input subsystem, a mouse input subsystem, a track pad input subsystem, a touch input display subsystem, and/or any other input subsystem known in the art. The chassis 302 also houses a display screen subsystem 308 that is coupled to the display engine 304 (e.g., via a coupling between the processing system and the display screen subsystem 308). In an embodiment, the display screen subsystem 308 may be provided by a display device that is integrated into the source device 300 and that includes a display screen (e.g., a display screen on a laptop/notebook computing device, a tablet computing device, or a mobile phone), or by a display device that is coupled directly to the source device 300 (e.g., a display device coupled to a desktop computing device by a cabled or wireless connection). The chassis 302 also houses a communication subsystem 310 that is coupled to the display engine 304 (e.g., via a coupling between the processing system and the communication subsystem 310). In an embodiment, the communication subsystem 310 may be provided by a wireless communication subsystem (e.g., a WiFi communication subsystem, a BLUETOOTH® communication subsystem, and/or other wireless communication subsystems known in the art), a network interface controller (NIC), and/or other communication subsystems known in the art.

In an embodiment, the memory system may also include instructions that, when executed by the processing system, cause the processing system to provide an application engine 312 that is configured to perform the functions of the application engines and source devices discussed below. The application engine 312 may provide any of a variety of applications known in the art on the source device 300, and may be configured to communicate with the display engine 304 as discussed below. In a specific example, the application engine may provide an operating system for the source device, as well as particular applications (e.g., the spreadsheet applications used in the examples discussed below). The chassis 302 may also house storage device (not illustrated, but which may be the storage device 108 discussed above with reference to FIG. 1) that provides a storage subsystem 314 that is configured to store the collaboration information discussed below, as well as other data utilized by components (e.g., the application engine 312) in the source device 300. While a specific embodiment of the source device 300 is illustrated and described herein, one of skill in the art in possession of the present disclosure will recognize that a wide variety of modification to the components and configuration of the source device 300 will fall within the scope of the present disclosure.

Figure 4:
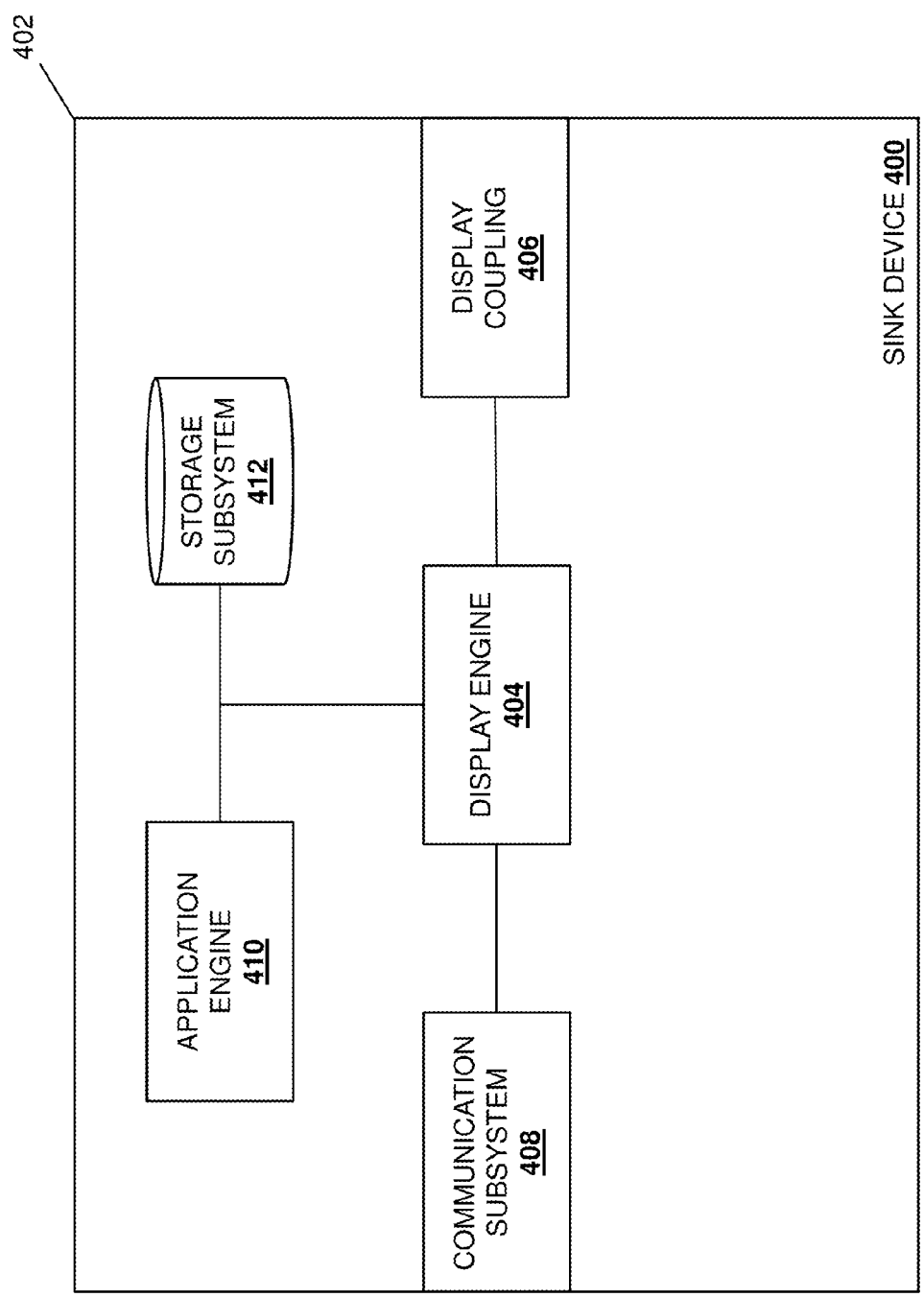
FIG. 4 is a schematic view illustrating an embodiment of a sink device used in the multi-user display collaboration system of FIG. 2.

Referring now to FIG. 4, an embodiment of a sink device 400 is illustrated that may be the sink device 204a discussed above with reference to FIG. 2. As such, the sink device 400 may be the IHS 100 discussed above with reference to FIG. 1, and/or may include some or all of the components of the IHS 100. As discussed above, while the sink device 400 is described as a shared display system such as projector computing system, a dongle computing system, a television display system, and a content management display system, the sink device 400 may be provided by a variety of other computing devices that include display screens that may be utilized by the source devices as discussed below. In the illustrated embodiment, the sink device 400 includes a chassis 402 that houses the components of the sink device 400, only some of which are illustrated in FIG. 4. For example, the chassis 402 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a display engine 404 that is configured to perform the functions of the display engines and sink devices discussed below. In a specific example, the processing system may include a graphics processing unit (GPU) that is configured to render collaboration information for display as discussed below, and in particular, the GPU in the sink device 400 may be configured with graphics drivers (e.g., OPENGL® available at www.opengl.org) for applications running on the source devices (e.g., a graphics driver for the spreadsheet application used in the examples below).

The chassis 402 also houses a display coupling 406 that is coupled to the display engine 404 (e.g., via a coupling between the processing system and the display coupling 406). In an embodiment, the display coupling 406 may be provided by an external connector (e.g., that is configured to connect to the display device 204b via a display cable, configured to connect directly to an external connector on the display device 204b, etc.), an internal connector (e.g., between the processing system and the display device 204b that is integrated with the sink device 400 and includes a display screen), an image projection component (e.g., a projector lens), and/or a variety of other display couplings that would be apparent to one of skill in the art in possession of the present disclosure. The chassis 402 also houses a communication subsystem 408 that is coupled to the display engine 404 (e.g., via a coupling between the processing system and the communication subsystem 408). In an embodiment, the communication subsystem 408 may be provided by a wireless communication subsystem (e.g., a WiFi communication subsystem, a BLUETOOTH® communication subsystem, and/or other wireless communication subsystems known in the art), a network interface controller (NIC), and/or other communication subsystems known in the art.

In some embodiments, the memory system may also include instructions that, when executed by the processing system, cause the processing system to provide an application engine 410 that is configured to perform the functions of the application engines and sink devices discussed below. The application engine 410 may be configured to provide any of a variety of applications known in the art on the sink device 400, and may be configured to communicate with the display engine 404 as discussed below. For example, as discussed in further detail below, the application engine 410 in the sink device 400 may be configured to execute applications locally in the sink device 400 that are also being executed on a source device in order give the appearance of the "sharing" of those applications with the display device 204b. The chassis 402 may also house storage device (not illustrated, but which may be the storage device 108 discussed above with reference to FIG. 1) that provides a storage subsystem 412 that is configured to store the collaboration information discussed below, as well as other data utilized by components (e.g., the application engine 410) in the sink device 400. While a specific embodiment of the sink device 400 is illustrated and described herein, one of skill in the art in possession of the present disclosure will recognize that a wide variety of modification to the components and configuration of the sink device 400 will fall within the scope of the present disclosure.

Figure 5:
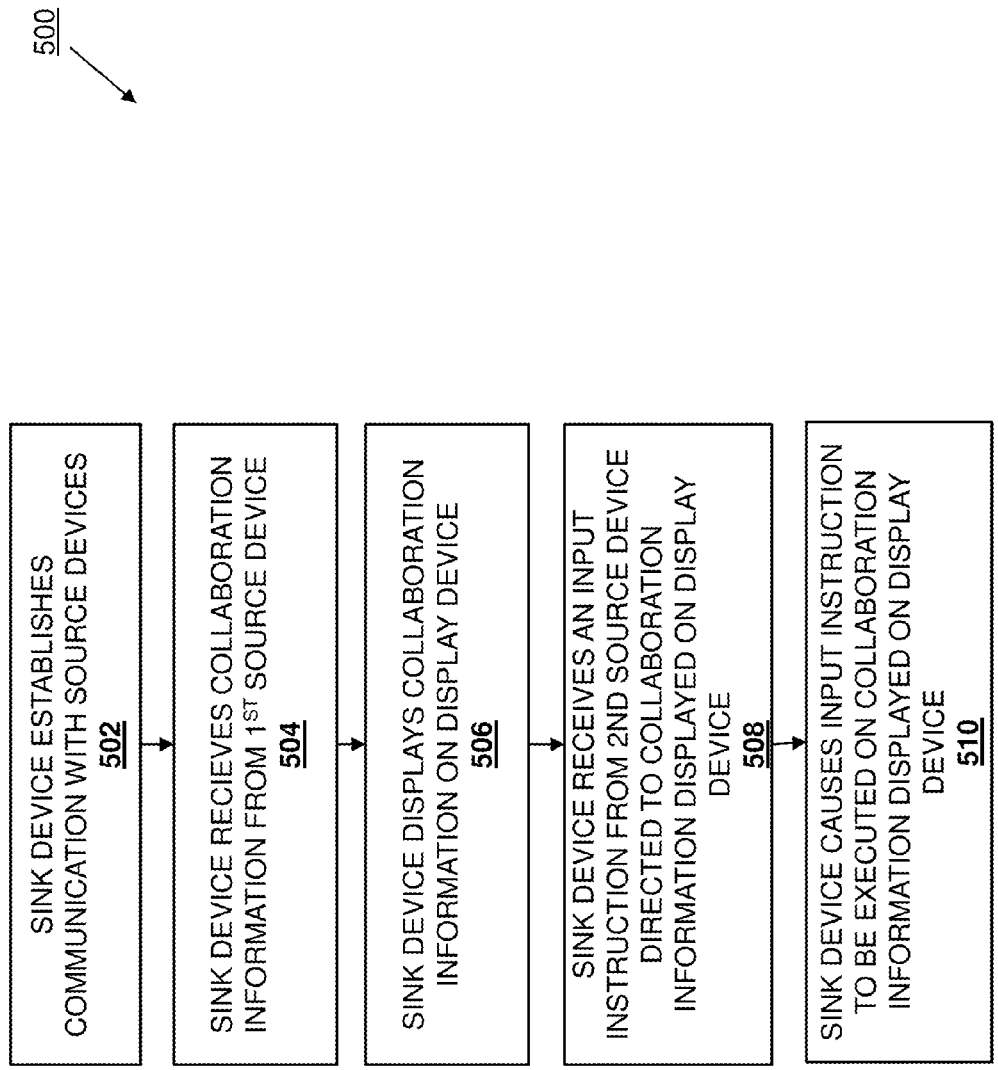
FIG. 5 is a flow chart illustrating an embodiment of a method for providing multi-user display collaboration.

Referring now to FIG. 5, an embodiment of a method 500 for multi-user display collaboration is illustrated. As discussed above, conventional collaboration solutions are limited in enabling collaboration, as only a single information handling system may "share" its collaboration information on a separate, larger screen at any given time, and manipulation of the collaboration information that is being displayed on that separate, larger screen requires control of the information handling system that is "sharing" that collaboration information. The method 500 overcomes these limitations by providing a "shared" display screen that allows multiple users using different source devices to provide respective collaboration information on that shared display screen, as well as provide inputs to any collaboration information displayed on the shared display screen, and save any collaboration information displayed on the shared display screen to their respective source device. As such, the shared display screen acts as a virtual extended display screen available to each of a plurality of source devices, and that each of the users of those source device may interact with as their own display screen thus enhancing the ability of multiple users to collaborate using any desired collaboration information.

Figure 6:
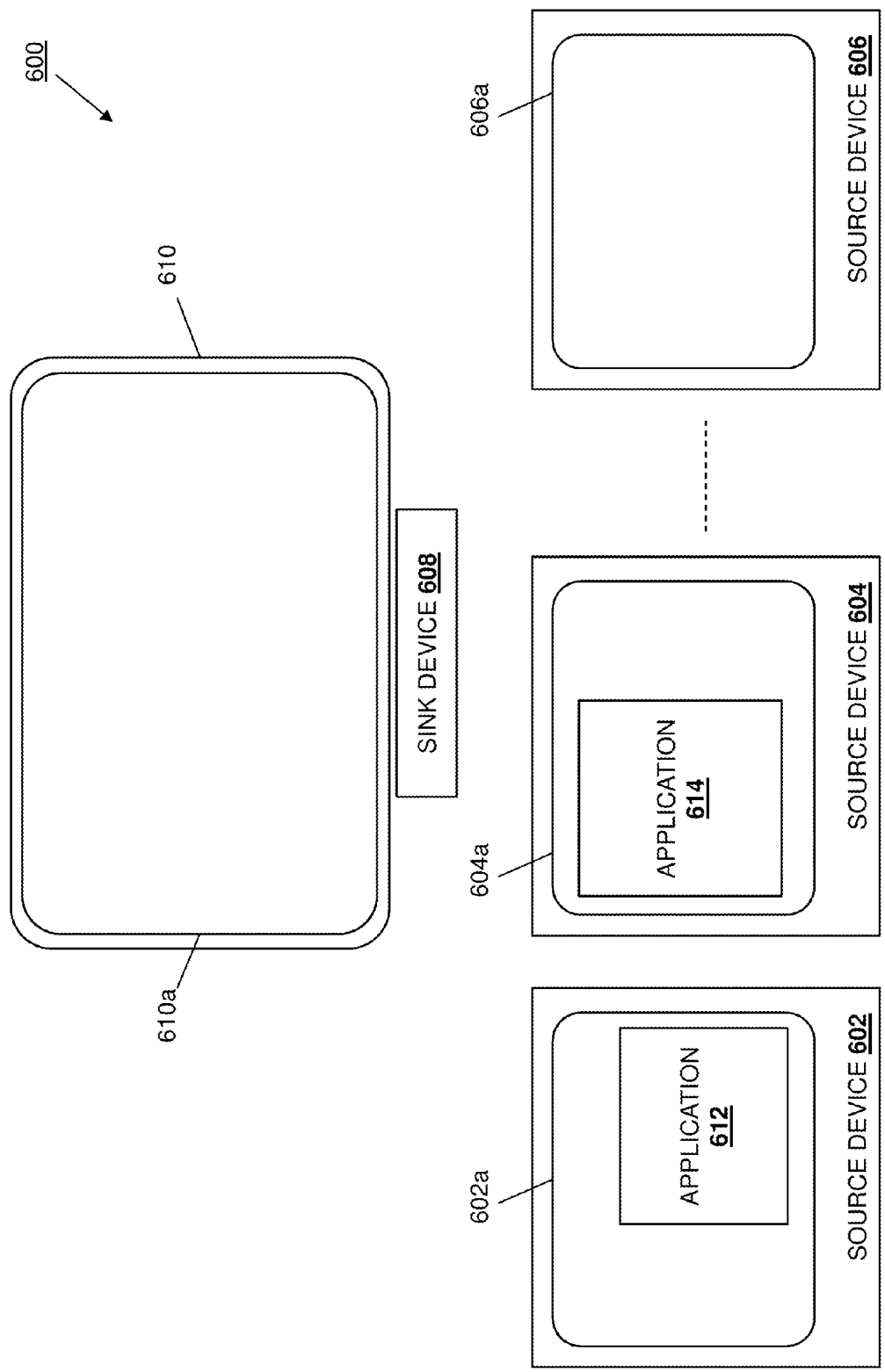
FIG. 6 is a schematic view illustrating an embodiment of the multi-user display collaboration system of FIG. 2 including a plurality of source devices prior to multi-user display collaboration.

The method 500 begins at block 502 where a sink device establishes communication with source devices. Referring now to FIG. 6, an embodiment of a multi-user display collaboration system 600 is illustrated that includes source devices 602, 604, and up to 606, each having respective source device display screens 602a, 604a, and up to 606a. The multi-user-display collaboration system 600 also includes a sink device 608 and a display device 610 having a display screen 610a. In the discussion below, the sink device 608 is illustrated and described as a projector computing device and the display device 610 is illustrated and described as a projector screen, but as discussed above, the sink device 608 and the display device 610 may be provided by a variety of components and/or integrated into a single device while remaining within the scope of the present disclosure. In the illustrated embodiment, the source device 602 includes an operating system and is providing an application 612 for display on its source device display screen 602a (e.g., via its application engine 312), the source device 604 includes an operating system and is providing an application 614 for display on its source device display screen 604a (e.g., via its application engine 312), and the source device 606 includes an operating system and is not providing any application for display on its source device display screen 606a. As discussed below, different operating systems may be provided on the different source devices 602, 604, and 606 while remaining within the scope of the present disclosure.

At block 502, the sink device 608 may operate to establish communication with the source devices 602, 604, and up to 606. For example, with reference to FIGS. 3 and 4, for each of the source devices 602, 604, and 606, the display engine 404 in the sink device 400 and the display engine 304 in the source device 300 may communicate wirelessly via the communication subsystems 408 and 308, respectively, in order to establish communication. In a specific example, the establishment of communications between any source device and the sink device 608 may be performed according to the teachings of U.S. patent application Ser. No. 15/274,426, filed on Sep. 23, 2016, and U.S. patent application Ser. No. 15/296,707, filed on Oct. 18, 2016, the disclosures of which are incorporated by reference in their entirety. As such, following block 502, each of the source devices 602, 604, and 606 may have paired (e.g., via a BLUETOOTH® pairing process), logged into (e.g., by providing authentication information that is validated by the display engine 404 in the sink device 400), and/or otherwise connected to the sink device 608 such that information may be passed between that source device and the sink device 608 as discussed below.

Figure 7A:
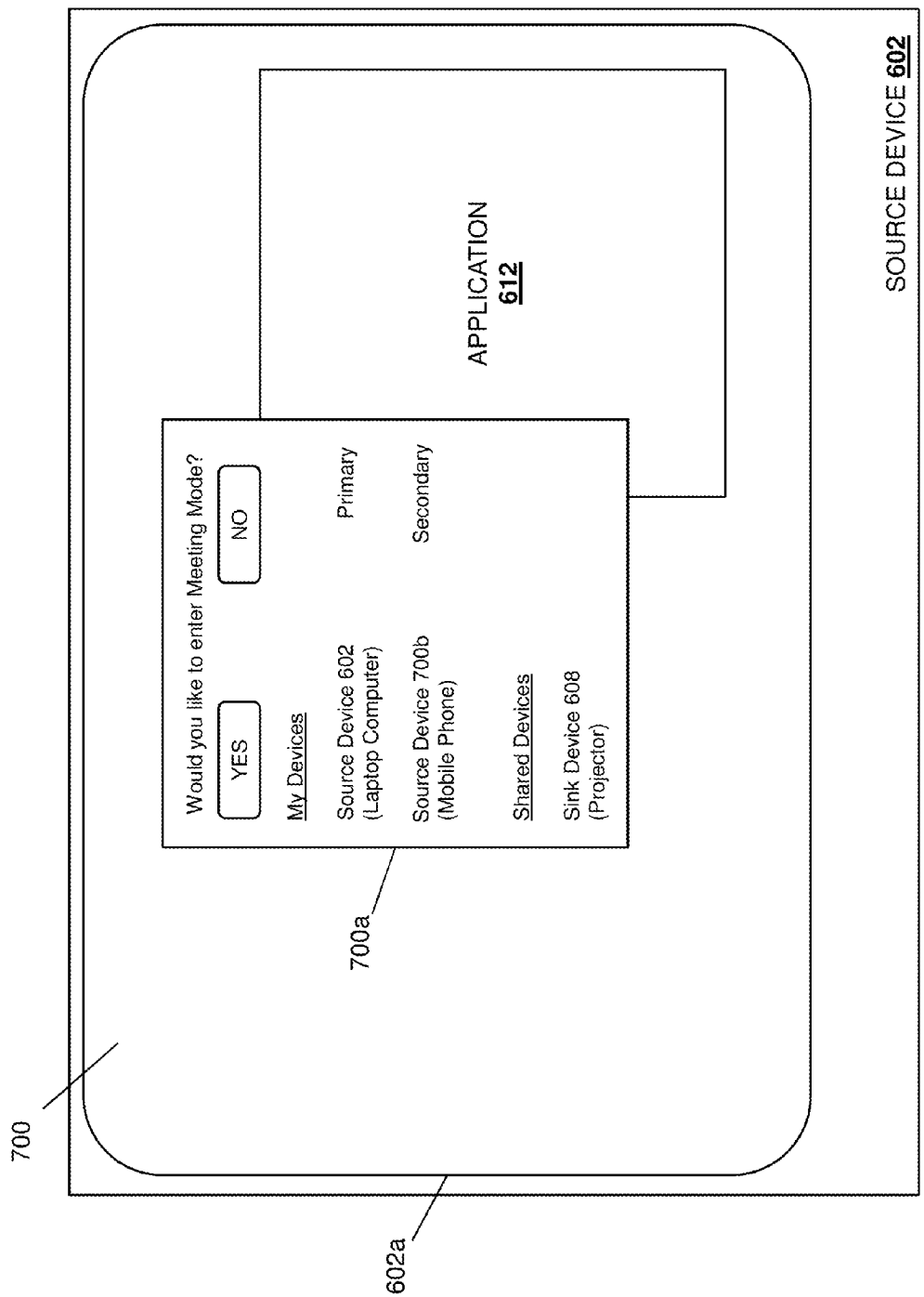
FIG. 7a is a screen shot illustrating an embodiment of a source device in the multi-user collaboration system of FIG. 2 displaying a multi-user display collaboration authorization screen.
Figure 7B:
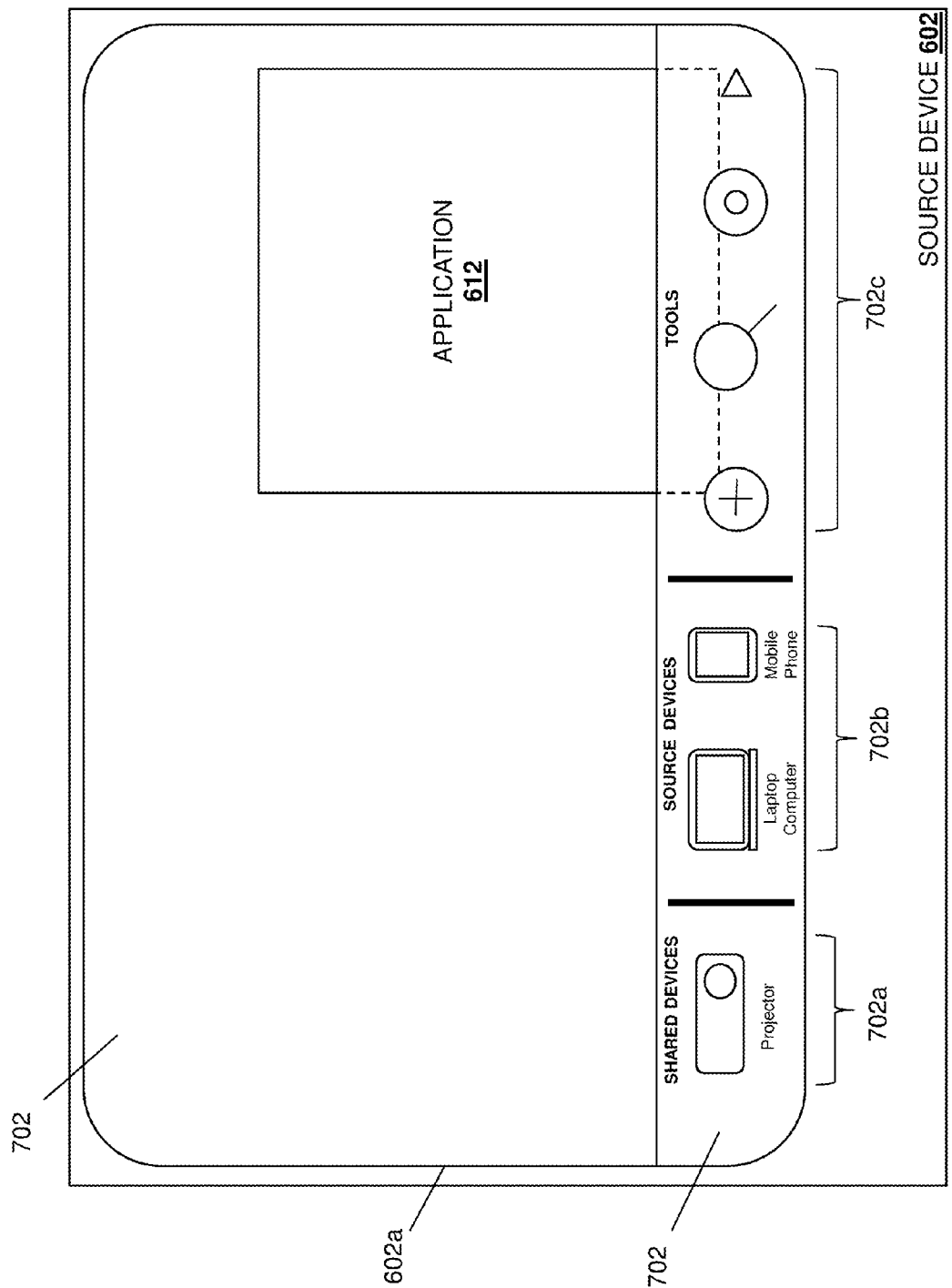
FIG. 7b is a screen shot illustrating an embodiment of a source device in the multi-user collaboration system of FIG. 2 displaying a multi-user display collaboration screen.

Referring now to FIGS. 7a and 7b, an embodiment of the establishment of communications between the source device 602 and the sink device 608 is illustrated, but one of skill in the art in possession of the present disclosure will recognize that any of the source devices 604 and/or 606 may perform similar operations in order to establish communications at block 502. FIG. 7a illustrates the source device 602 displaying a multi-user display collaboration authorization screen 700 that may be provided on source devices prior to or in response to establishing communication between those source devices and the sink device 608. In the illustrated embodiment, the multi-user display collaboration authorization screen 700 includes an authorization element 700a that may be provided for display on the source device 602 and that allows the user to authorize the sharing of collaboration information with the sink device 608. For example, the authorization element 700a in FIG. 7a has been provided to allow the user of the source device 602 to authorize a "Meeting Mode" (e.g., by selecting either a "YES" button or a "NO" button in the authorization element 700a) that allows the source device 602 to provide collaboration information on the display device 610 via the sink device 608. Furthermore, in the illustrated embodiment, the authorization element 700a displays the devices of the user that are part of (or available to be part of) the Meeting Mode, including the source device 602 (a laptop computer that is the primary device of the user in this example) and a source device 700b (a mobile phone that is the secondary device of the user in this example), as well as a shared device that is the sink device 608 (a projector in this example). As such, the user may select the "YES" button in the authorization element 700a to establish communications (or following the establishment of those communications) with the sink device at block 502, and subsequently enter the Meeting Mode where the shared device (the sink device 608) enables the source device to share collaboration information on the display screen 610a of the display device 610.

FIG. 7b illustrates the source device 602 displaying an embodiment of a multi-user display collaboration screen 702 that may be provided subsequent to establishing communications with the sink device 608 at block 502. In the illustrated embodiment, the multi-user display collaboration screen 702 provides a multi-user display collaboration information bar 702 that provides graphical user interface (GUI) elements that allow for the sharing of collaboration information that is located on the source device 602, for access to collaboration information that is shared by other source devices with the sink device 608, and for the ability to define settings for interactions with the sink device 608. For example, in FIG. 7b, the multi-user display collaboration information bar 702 includes a shared device section 702a providing a shared device GUI element (identifying the sink device 608/projector in this example), a source device section 702b providing source device GUI elements (which identifies the source devices of the user of the source device 602 in the illustrated example, but which may also identify other source devices connected to the sink device 608), and a tool section 702c providing tool GUI elements that allow the user to access functionality not displayed on the multi-user display collaboration information bar 702, access information not displayed on the multi-user display collaboration information bar 702, access settings for the Meeting Mode, and/or perform a variety of other toolbar functionality that would be apparent to one of skill in the art in possession of the present disclosure.

Figure 8A:
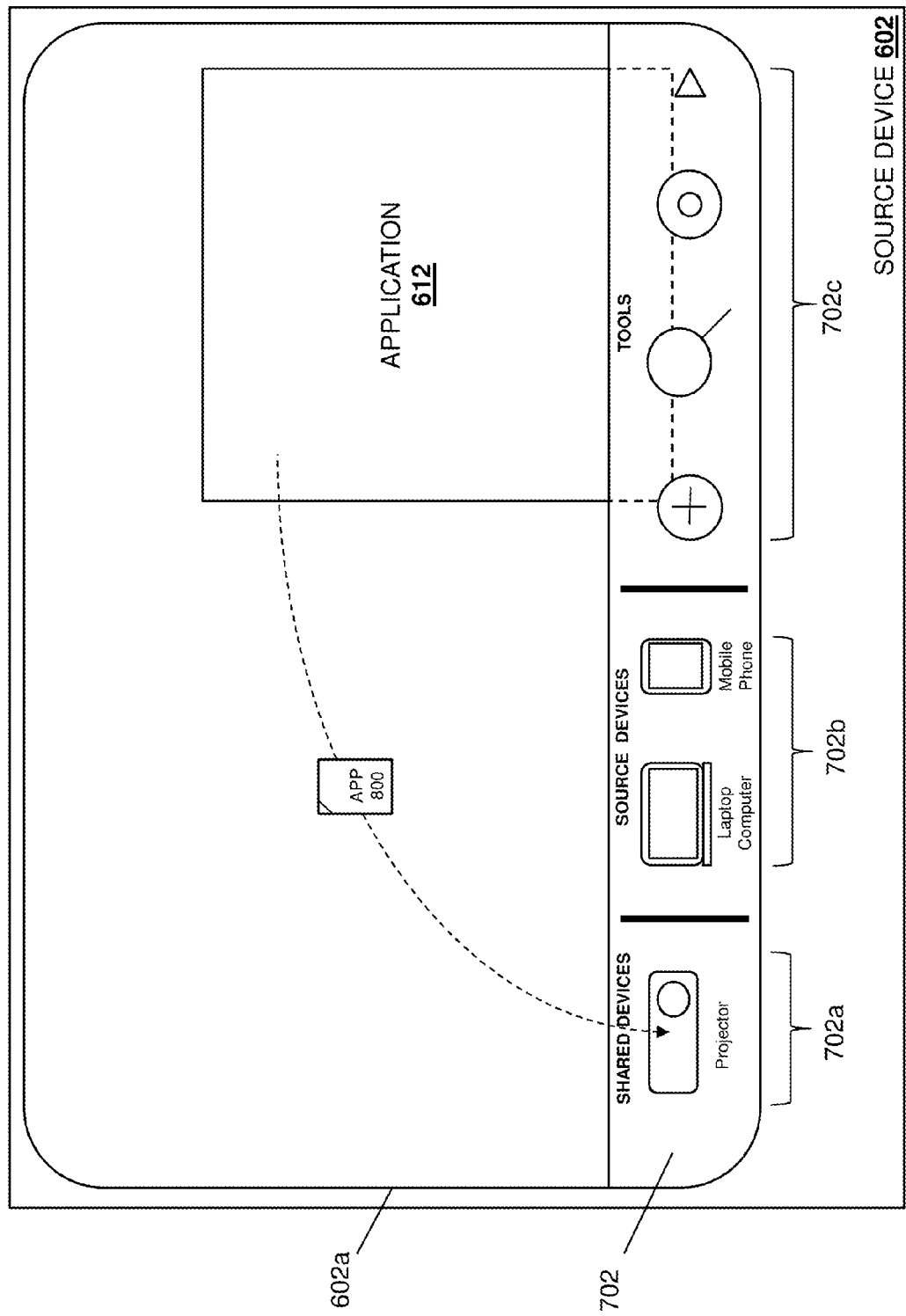
FIG. 8a is a screen shot illustrating an embodiment of a source device in the multi-user collaboration system of FIG. 2 sharing collaboration information for multi-user display collaboration.
Figure 8B:
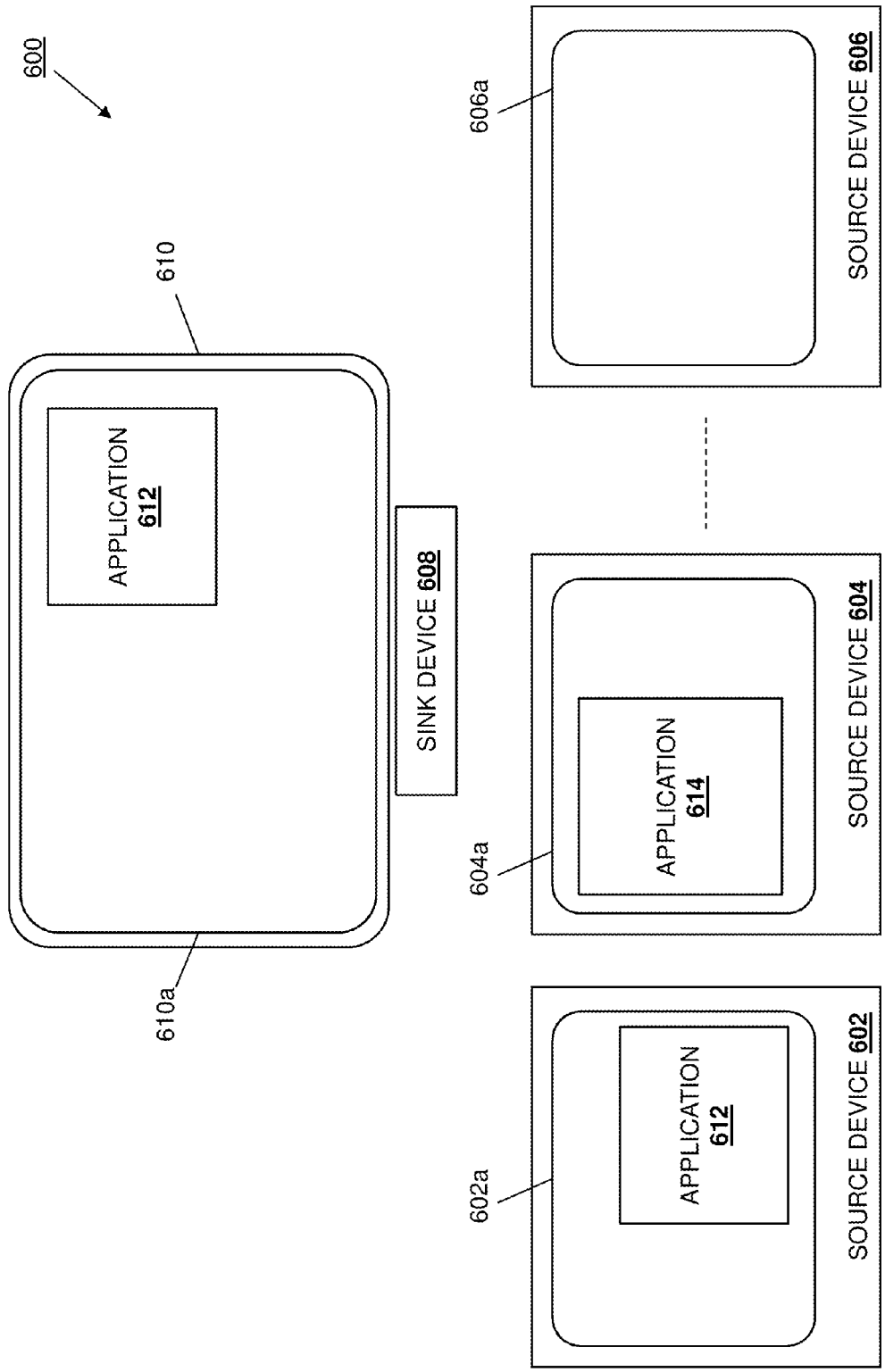
FIG. 8b is a schematic view illustrating an embodiment of a source device in the multi-user collaboration system of FIG. 2 sharing collaboration information for multi-user display collaboration via a sink device in the multi-user collaboration system of FIG. 2.

The method 500 may then proceed to block 504 where the sink device receives collaboration information from a first source device, and then to block 506 where the sink device displays the collaboration information on a display device. Referring now to FIGS. 8a and 8b, one embodiment of the selection of collaboration information on the source device 602, and the provisioning of that collaboration information to the sink device 608 for display on the display device 610, is illustrated. For example, FIG. 8a illustrates how a user of the source device 602 may select collaboration information that includes the application 612 that is being displayed on the source device display screen 602a (e.g., using an input subsystem such as a mouse), and "drag" that collaboration information (represented by an "app" icon 800) to the shared device GUI element in the shared device section 702a of the multi-user display collaboration information bar 702. In response, the sink device 608 is then provided access to that collaboration information and, as illustrated in FIG. 8b, operates to provide that collaboration information on the display screen 610a of the display device 610 (e.g., as illustrated by the display of the application 612 on the display screen 610a of the display device 610). As discussed below, there are a number of techniques that may be performed by the source device 602 and the sink device 608 to allow the sink device access to the collaboration information such that the collaboration information is provided for display on the display screen 610a of the display device 610, a few of which are discussed below.

In one embodiment, the sink device 608 may operate with the source device 602 to perform an "enhanced screencast" of the source device display screen 602a of the source device 602, a portion of the source device display screen 602a of the source device 602, the application 612 being displayed by the source device 602, and/or any other information provided for display by the source device 602. For example, the display engine 304 in the source device 602 (e.g., provided, at least in part, by the GPU discussed above) may render the frames that are displayed on the source device display screen 602a, as well as encode those frames into packets (e.g., via a compression standard such as H.264 or H.265/HEVC) and send those encoded packets to the sink device 608 via the wireless communication coupling (e.g., WiFi). The sink device 608 may then decode the encoded packets to retrieve the frames, and provide those frames for display on the display screen 610a of the display device 610 (e.g., to reproduce the source device display screen 602a, a portion of the source device display screen 602a, the application 612, and/or any other information provided for display by the source device 602.)

In another embodiment, the sink device 608 may operate with the source device 602 to copy some or all of the collaboration information from the source device 602 (e.g., from the storage subsystem 314) to the sink device 608 (e.g., to the storage subsystem 412) so that the sink device 608 may display a local copy of the collaboration information (i.e., located on the sink device 608) on the display screen 610a of the display device 610 in a manner that makes it appear as though the collaboration information on the source device 602 (e.g., the application 612) is being shared on the display device 610. In a specific example, the application engine 410 in the sink device 608 may be configured to provide the application 612 (e.g., a spreadsheet application via a graphics driver for that spreadsheet application), and the sink device 608 may copy the particular collaboration information being displayed by the application 612 provided on the source device 602 (e.g., information associated with a particular spreadsheet including cell values, formatting, equations, etc.) so that it may be displayed via the application 612 provided by the sink device 608 on the display screen 610a of the display device 610 in the same manner as the source device 602 provides it on the source device display screen 602a. Such techniques that allow the sink device 608 to provide the collaboration information from local copies of that collaboration information on the sink device 608 may operate to reduce or eliminate latency associated with the need to "push" frame-by-frame information from the source device to the sink device (e.g., when that collaboration information is provided via the sink device 608 on the display device 610 using the screen casting techniques discussed above).

In another embodiment, the sink device 608 may operate with the source device 602 to create a tunnel (e.g., an Internet Protocol (IP) tunnel, a Peer-to-Peer (P2P) tunnel, etc.) between the source device 602 and the sink device 608, and the sink device 608 may utilize that tunnel to display the collaboration information on the display screen 610a of the display device 610 as it is displayed on the source device 602. For example, the tunnel may provide the sink device 608 access to applications and/or files stored in the storage subsystem 314 on the source device 602 such that the sink device 608 may operate the application 612 and associated files or data (or instruct the source device 602 to operate the application 612 and associated files or data) to provide the collaboration information for display on the display screen 610a of the display device 610. The use of such tunneling techniques to display collaboration information allows devices in the system to act as both source devices and sink devices in different embodiments. While a few examples of techniques for displaying the collaboration information on the display device 610 have been provided, one of skill in the art in possession of the present disclosure will recognize that other techniques for displaying the collaboration information at block 506 will fall within the scope of the present disclosure as well.

In any of the above embodiments (e.g., the casting, the local copying, and the tunneling to provide the collaboration information for display on the display device 610), the rendering of the collaboration information may be a cooperative effort between the source device and the sink device. For example, the source device may generate graphics layer commands without rendering the associated graphics on the source device display screen, and then send those graphics layer commands to the sink device for rendering on the display device 610, thus avoiding the latency associated with first rendering those graphics layer commands on the source device display screen, then encoding, sending, and decoding that information for rendering on the display device 610.

Figure 9B:
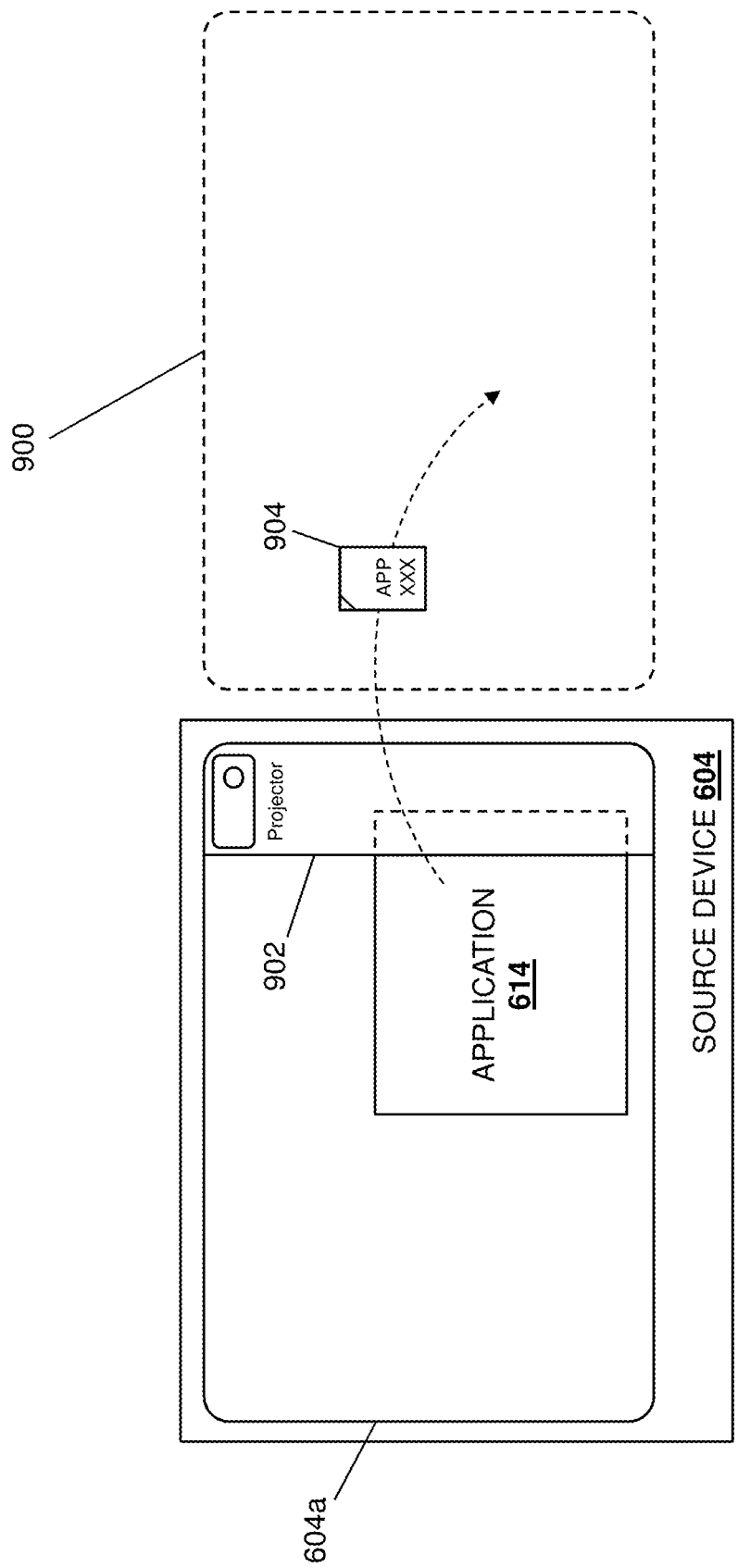
FIG. 9b is a schematic view illustrating an embodiment of a source device in the multi-user display collaboration system of FIG. 2 sharing collaboration information for multi-user display collaboration via a virtual display screen provided by a sink device in the multi-user display collaboration system of FIG. 2.

Referring now to FIGS. 9a and 9b, another embodiment of the selection of collaboration information on the source device 602, and the provisioning of that collaboration information to the sink device 608 for display on the display device 610 is illustrated. FIG. 9a illustrates how the sink device 608 may operate to provide a user of the source device 604 with a "virtual source device display screen" 900 that corresponds to the display screen 610a of the display device 610 (e.g., in response to establishing a connection with the sink device 608 and/or entering the Meeting Mode discussed above.) For example, the virtual source device display screen 900 may be considered similarly to a physical display device with a display screen that is used to provide an "extended desktop" for the source device 604, with the exception that the virtual source device display screen 900 is accessible by each of the source devices (e.g., 602, 604, and up to 606) that have established a connection with the sink device 608 and/or entered the Meeting Mode discussed above. In the illustrated example, the source device 604 is providing a multi-user display collaboration bar 902 (including a shared device icon—the projector icon in this example) adjacent an edge of the source device display screen 604a that is "adjacent" the virtual source device display screen 900 in order to indicate to the user of the source device 604 that they may access the virtual source device display screen 900 my moving their cursor past that edge of the source device display screen 604a. However, access to the virtual source device display screen 900 may be provided a variety of manners while remaining within the scope of the present disclosure.

Figure 10:
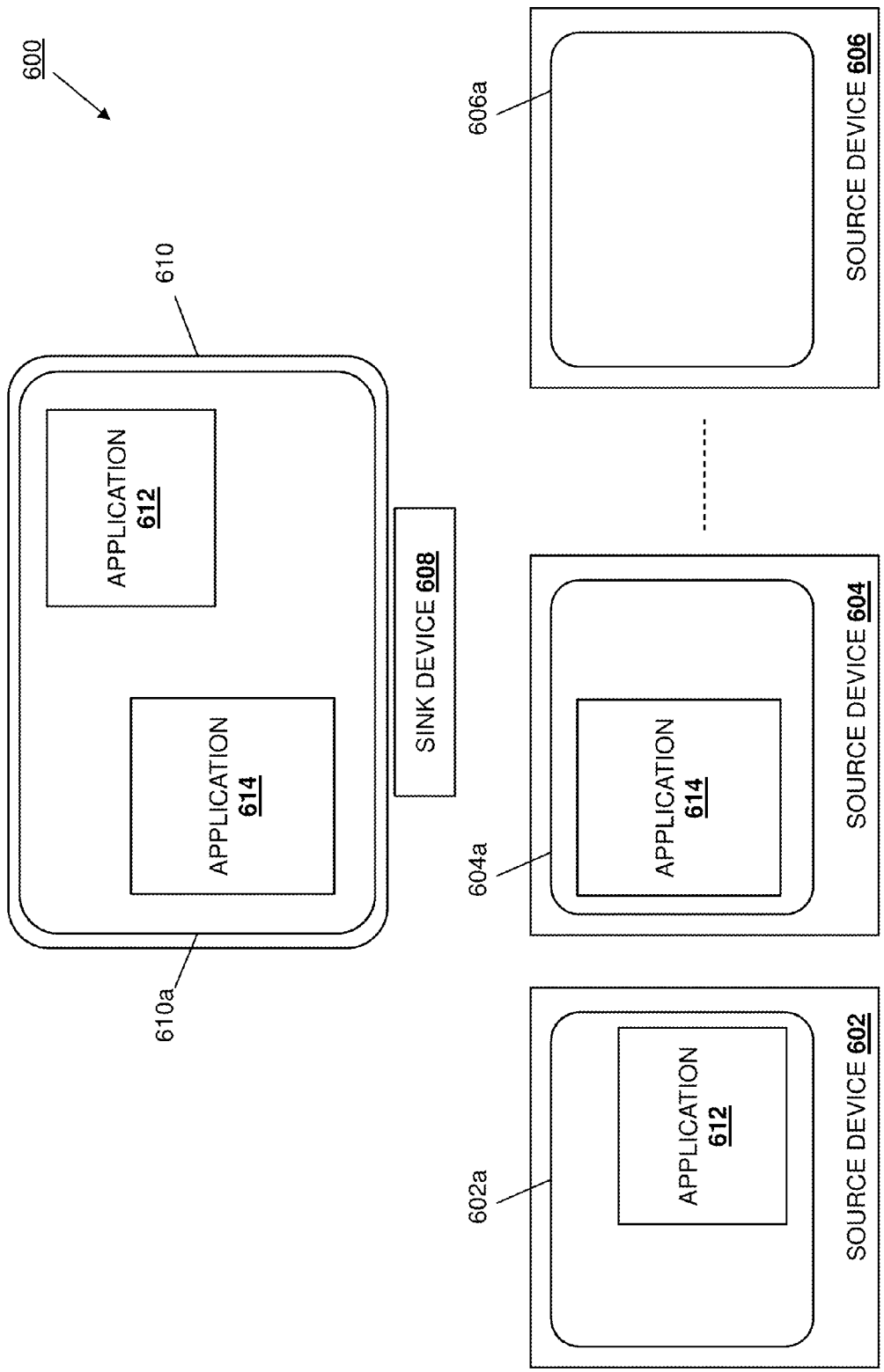
FIG. 10 is a schematic view illustrating an embodiment of source devices in the multi-user display collaboration system of FIG. 2 sharing collaboration information for multi-user display collaboration through a sink device in the multi-user display collaboration system of FIG. 2.

FIG. 9b illustrates how the user of the source device 604 may select collaboration information (e.g., the application 614 in the illustrated example) displayed on the source device display screen 604a (e.g., using an input subsystem such as a mouse), and "drag" that collaboration information (represented by an "app" icon 904) to the virtual source device display screen 900. In response, the sink device 608 may then be provided access to that collaboration information, and may operate to provide it for display using techniques similar to those discussed above with reference to FIG. 8b. For example, FIG. 10 illustrates the sink device 608 operating to provide the collaboration information from the source device 602 (i.e., the application 612) and the collaboration information from the source device 604 (i.e., the application 614) on the display screen 610a of the display device 610 following the provisioning of the collaboration information to the virtual source device display screen 900. As discussed below, virtual source device display screens similar to the virtual source device display screen 900 may be provided for each source device communicating with the sink device 608, and thus provides the input subsystem 306 in each source device access to the collaboration information displayed on the display screen 610a of the display device 610 by the sink device 608.

In some embodiments, collaboration information provided to the sink device 608 for display on the display screen 610a of the display device 610 may be stored (e.g., "backed up") in the sink device 608, on any or all of the connected source devices, and/or on a storage system coupled to multi-user display collaboration system 200 via a network (e.g., on "the cloud"). While collaboration information from only two different source devices has been described and illustrated as being provided for display by the sink device 608 on the display device 610, one of skill in the art in possession of the present disclosure will recognize that any number of source devices may provide collaboration information for display by the sink device 608 on the display device 610 while remaining within the scope of the present disclosure. Furthermore, as discussed above, in some embodiments the different source devices that provide different collaboration information to the sink device 608 for display on the display device 610 may operate using different operating systems (e.g., the source device 602 may utilize the WINDOWS® operating system available from Microsoft Corporation of Redmond, Wash., United States; while the source device 604 may utilize OS X® operating system available from APPLE®, Inc. of Cupertino, Calif., United States). For example, each of the source devices sharing collaboration information, as well as the sink device, may include an application that is configured to extract object identification (OID) information for any collaboration information under their control, and share that OID information with the other devices, which allows collaboration information associated with different operating systems to be shared and modified.

Figure 11:
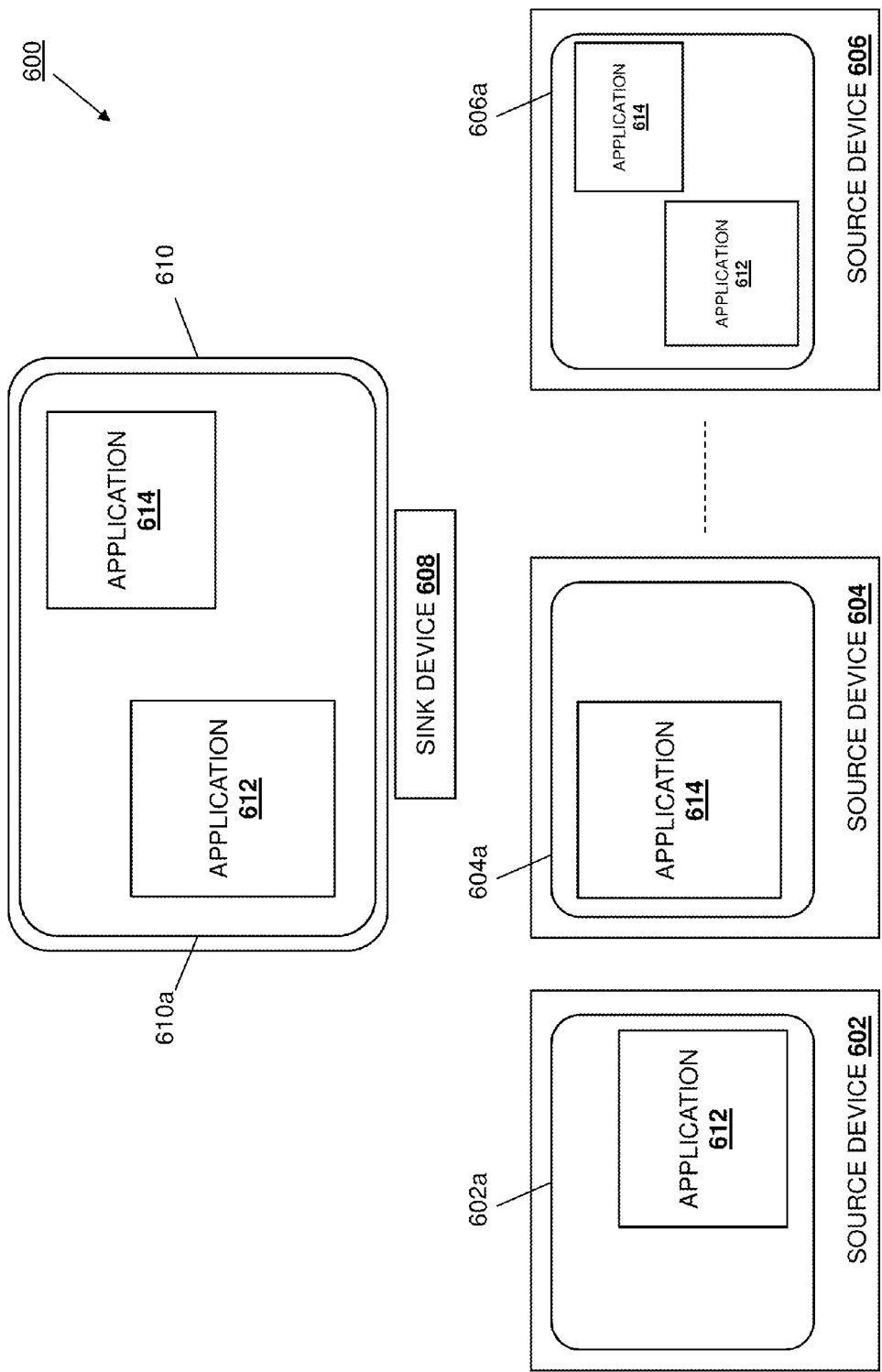
FIG. 11 is a schematic view illustrating an embodiment of the multi-user display collaboration system of FIG. 2 including a source device mirroring collaboration information displayed via a sink device in the multi-user display collaboration system of FIG. 2.

In an embodiment, with the sink device 608 providing the collaboration information from the source device 602 (i.e., the application 612) and the collaboration information from the source device 604 (i.e., the application 614) on the display screen 610a of the display device 610, other source devices may operate to "mirror" or display that collaboration information on their respective source device display screens. Such functionality may be particularly beneficial in situations where the user of a source device is positioned relatively far from the display device 610 (e.g., such that they cannot clearly make out the collaboration information provided on its display screen 610a). As illustrated in FIG. 11, a user of the source device 606 may send a request to the sink device 608 to mirror the collaboration information that is being provided for display on the display screen 610a of the display device 610, and the sink device 608 and source device 606 may operate to provide the collaboration information from the source device 602 (i.e., the application 612) and the collaboration information from the source device 604 (i.e., the application 614) on the source device display screen 606a of the source device 606. The mirroring illustrated in FIG. 11 provides an example of the sink device 608 acting as a source device (e.g., providing collaboration information received while it was acting as a sink device to another device (i.e., the source device 606)). As such, the display of the collaboration information on the source device 606 may be performed using any of the techniques discussed above.

While the examples above illustrate the provisioning of collaboration information on the display device 610 that is also displayed on one of the source devices 602, 604, and/or 606, in other examples, any of the source devices may instruct the sink device 608 to provide collaboration information for display on the display device that is not actually displayed on any of the source devices. For example, the source device 602 may instruct the sink device 608 to open a spreadsheet application with data retrieved via a network storage such that the spreadsheet application and data are displayed on the display device 610. Following the display of that collaboration information, any of the source devices may provide inputs that modify that collaboration information (which may then be saved in the network storage) as discussed below.

Figure 12:
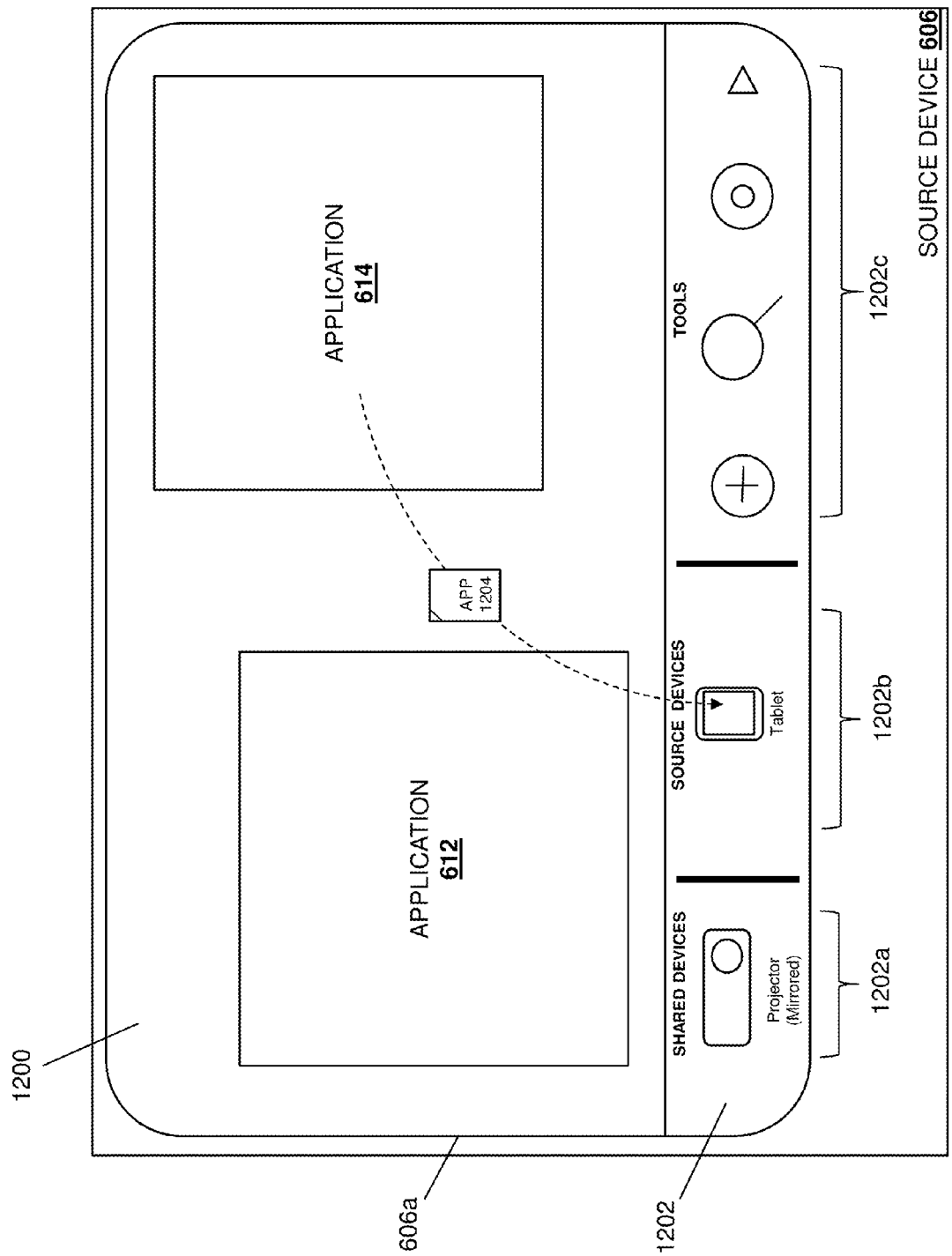
FIG. 12 is a schematic view illustrating an embodiment of the source device in the multi-user display collaboration system of FIG. 2 saving mirrored collaboration information in the multi-user display collaboration system of FIG. 2.

As illustrated in FIG. 12, the mirroring of the collaboration on the source device 606 provides the ability for the user of the source device 606 to provide inputs to the collaboration information, save copies of the collaboration information, and/or perform other functions that would be apparent to one of skill in the art in possession of the present disclosure. FIG. 12 illustrates the source device 606 providing a mirrored multi-user display collaboration screen 1200 that includes the collaboration information from the source device 602 (i.e., the application 612) and the collaboration information from the source device 604 (i.e., the application 614), as well as a multi-user display collaboration bar 1202 that is similar to the multi-user display collaboration bar 702 above and provides graphical user interface (GUI) elements that allow for the saving of collaboration information that is being displayed on the display device 610 by the sink device 608. For example, in FIG. 12, the multi-user display collaboration information bar 1202 includes a shared device section 1202a providing a shared device GUI element (identifying the sink device 608/projector from which the display is being mirrored in this example), a source device section 1202b providing a source device GUI element (which may identify the source device 606 (a tablet computing device in this example), and/or any other source devices connected to the sink device 608), and a tool section 702c providing tool GUI elements similar to those discussed above.

FIG. 12 illustrates how the user of the source device 606 may use an input device (e.g., a touch input display screen on the source device 606) to select the application 614 that is provided as part of the collaboration information that is being displayed by the sink device 608 on the display device 610 and that is also being mirrored on the source device 606, and "drag" the application 614 (as indicated by the "app" icon 1204) to the source device GUI element in the source device section 1202b in order to cause to that application 614 to be copied to the source device 606 (e.g., to its storage subsystem 314). The details of copying collaboration information from a mirrored screen such as that illustrated in FIG. 12 are substantially similar to the details associated with receiving input instructions directed to collaboration information displayed by the sink device 608 on the display device 610 at block 508 and causing those input instructions to be executed on that collaboration information at block 510, discussed below. As such, the "dragging" of the application 614 (as indicated by the "app" icon 1204) to the source device GUI element in the source device section 1202b may be received by the sink device 608 (as discussed below) as a save input instruction, and may cause the sink device 608 to cause a copy of the application 614 to be provided to the source device 606 (e.g., via the sink device 608 retrieving the copy of the application 614 from the source device 604 and sending it to the source device 606, via the sink device 608 sending a local copy of the application 614 to the source device 606, via the sink device 608 instructing the source device 604 to send a copy of the application 614 to the source device 606, etc.)

Figure 13:
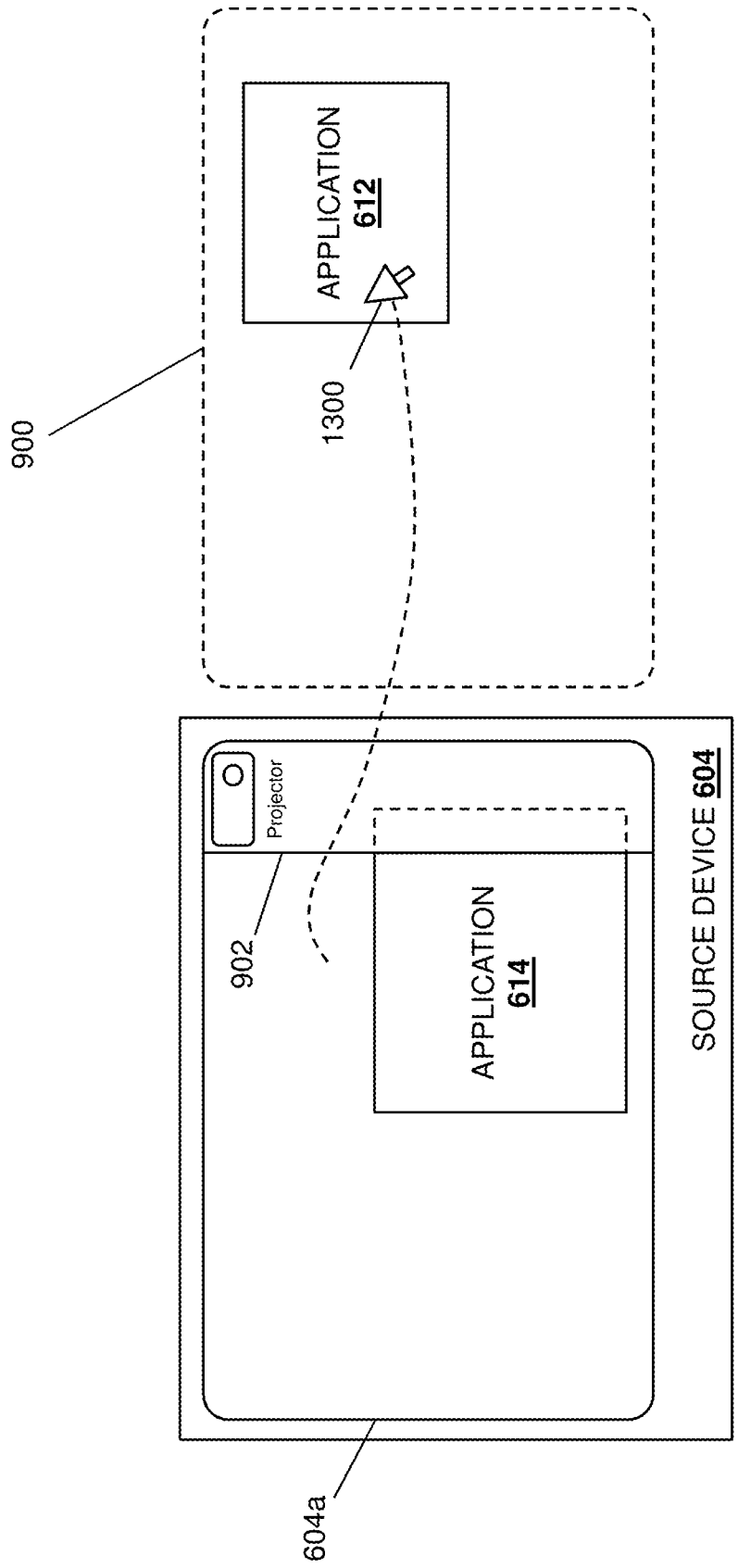
FIG. 13 is a schematic view illustrating an embodiment of a source device in the multi-user display collaboration system of FIG. 2 manipulating collaboration information via a virtual screen provided by a sink device in the multi-user display collaboration system of FIG. 2.

The method then proceeds to block 508 where the sink device receives an input instruction from a second source device that is directed to collaboration information displayed on the display device. In an embodiment, any of the source devices 602, 604, and up to 606 may provide an input instruction to the sink device 608 that is directed to collaboration information that is being displayed on the display device 610. For example, FIG. 13 illustrates the source device 604 along with the virtual source device display screen 900 discussed above that includes the application 612 (i.e., the collaboration information that was provided by the source device 602 to the sink device 608 for display on the display device 610), as well as the user of the source device 604 providing an input instruction via a source device input element 1300 (e.g., a mouse cursor) that has been moved from the source device display screen 604*a* to the virtual source device display screen 900. The input instruction received at block 508 may include any of a variety of input instruction such as, for, example, a deletion of some of the collaboration information, an addition to the collaboration information, a modification to the collaboration information, and/or any of a variety of other input instructions that would be apparent to one of skill in the art in possession of the present disclosure.

Figure 14:
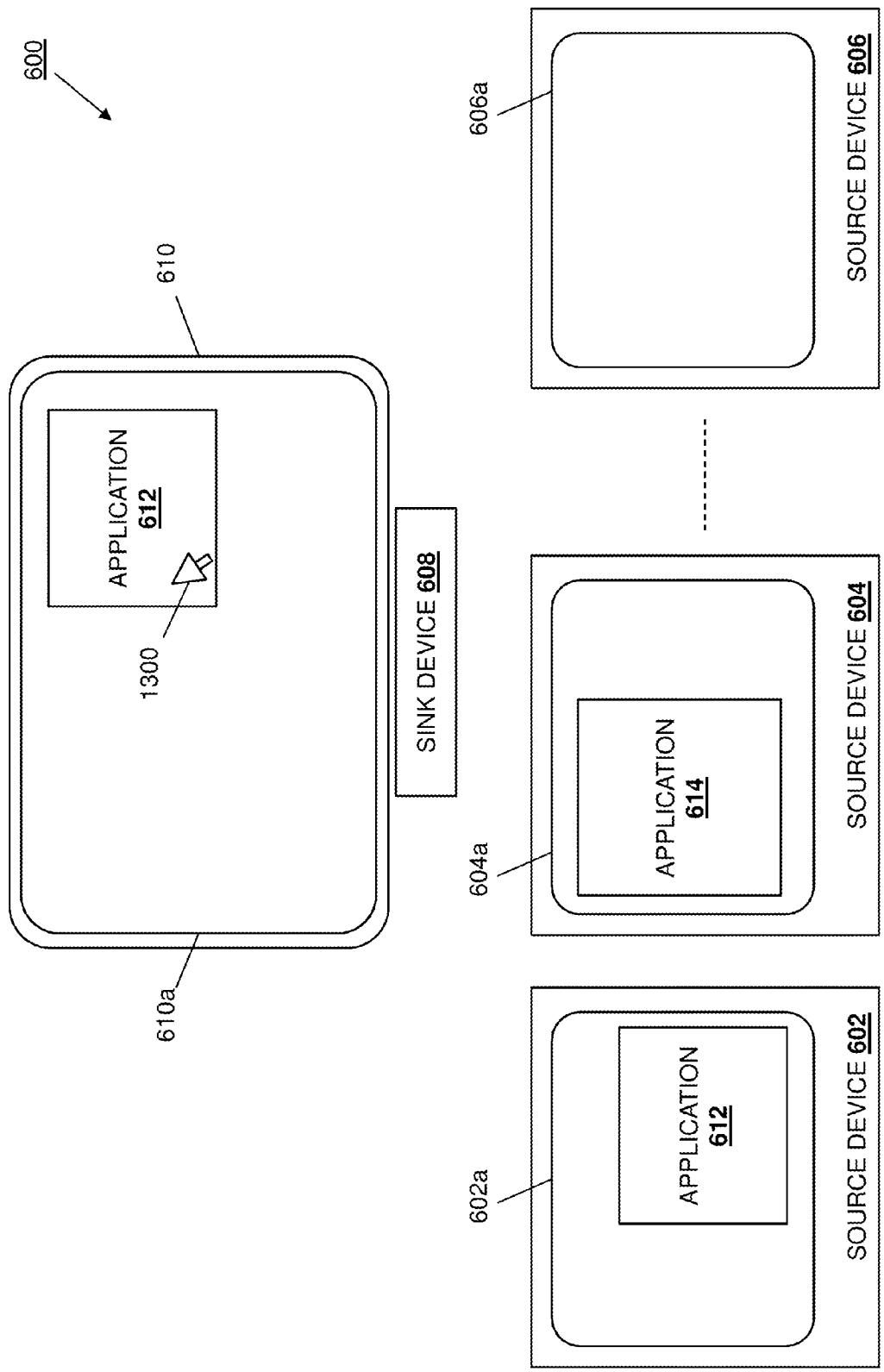
FIG. 14 is a schematic view illustrating an embodiment of a sink device in the multi-user display collaboration system of FIG. 2 providing an input element from a source device on a display device displaying collaboration information provided by a different source device.
Figure 15:
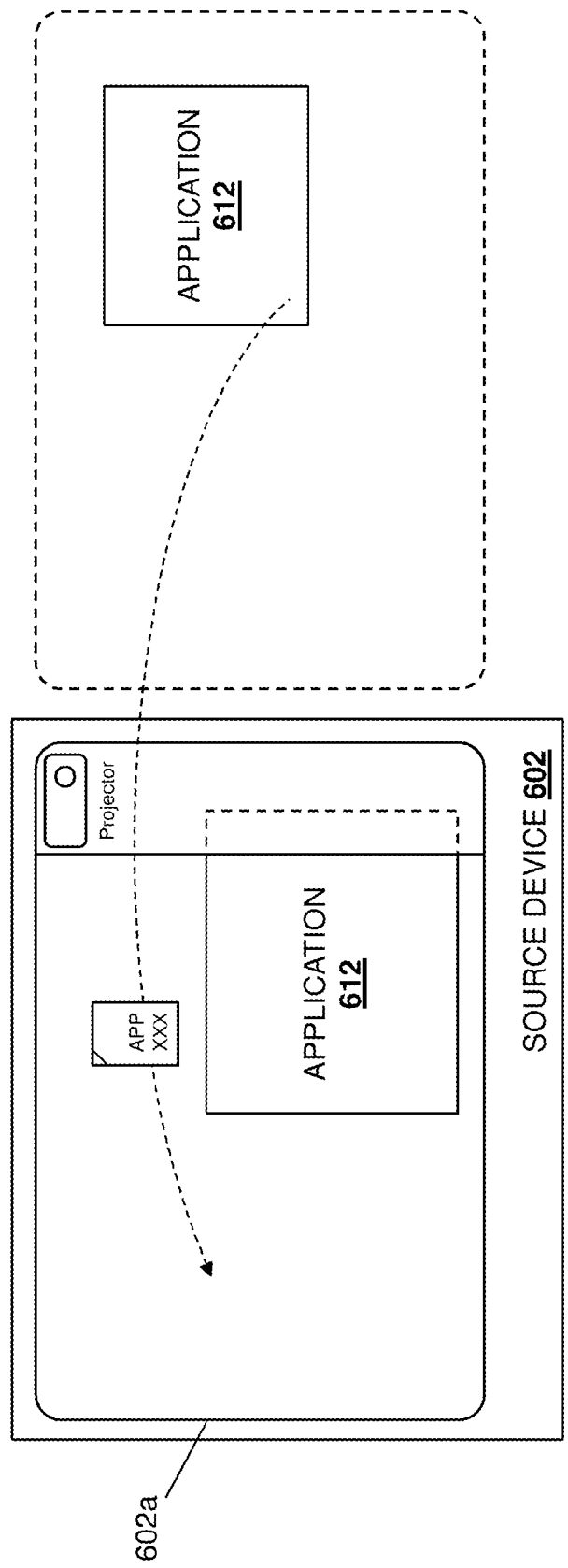
FIG. 15 is a schematic view illustrating an embodiment of a source device in the multi-user display collaboration system of FIG. 2 saving collaboration information from a virtual screen provided by a sink device in the multi-user display collaboration system of FIG. 2.

The provisioning of the input instruction by the second source device at block 508 may include the sink device operating to provide an input element that is controlled by the second source device for display on the display device. In an embodiment, at block 508, the sink device 608 may receive source device input element coordinates from source device 604 that describe a position of the source device input element 1300 relative to the display screen 610*a* on the display device 610 that is displaying the application 612 (e.g., Human Interface Device (HID) information), and may use those source device input element coordinates to provide the source device input element 1300 for display on the display screen 610*a* of the display device 610, as illustrated in FIG. 14. For example, in response to the user of the source device 602 moving the source device input element 1300 past the multi-user display collaboration bar 902, the source device 604 may send source device input element coordinates to the sink device 608 that allow the sink device 608 to render the source device input element 1300 on the display screen 610*a* of the display device 610. As such, each of the source devices 602, 604, and 606 may control a respective source device input element that may be provided for display on the display screen 610*a* of the display device 610 as it is manipulated by the user of its respective source device. In the specific example of the mirrored display screen discussed above with reference to FIG. 12, the input element provided on the mirrored display may be "mirrored" in a similar fashion on the display screen 610*a* of the display device 610 as well. Using its respective input element provided on the display screen 610*a* of the display device 610, each source device may provide input instruction(s) directed to the collaboration information provided by the sink device 608 for display on the display device 610, including deleting at least some of the collaboration information, adding to the collaboration information, modifying at least some of the collaboration information, saving a copy of the collaboration information (e.g., by moving the collaboration information from the virtual source device display screen to the source device display screen on that source device as discussed above), and/or performing any other actions on the collaboration information that would be apparent to one of skill in the art in possession of the present disclosure.

The method then proceeds to block 510 where the sink device causes the input instruction to be executed on the collaboration information displayed on the display device. At block 510, the sink device 608 operates to cause input instructions that are directed to the collaboration information that is being provided for display on the display screen 610*a* of the display device 610 to be executed. In different embodiments, input instructions that are provided by a source device and that are directed to collaboration information that is provided by a different source device may be caused to be executed in a variety of manners. In the embodiments discussed below, each source device may monitor for input actions to the collaboration information they've provided to the sink device 608, while the sink device may monitor all of the input actions to any of the collaboration information provided by each of the source devices, although other input instruction monitoring is envisioned as falling within the scope of the present disclosure.

In an embodiment, the sink device 608 may operate to detect input instructions directed to collaboration information displayed on the display device, and report those input instructions back to the source device that is providing that collaboration information so that that source device may cause those input instructions to be executed. For example, the sink device 608 may identify a text input instruction along with source device input element coordinates that indicate the location of the source device input element 1300 in the FIG. 13 (e.g., a particular cell of a spreadsheet), and may provide that information to the source device 602 that is providing the application 612 so that the source device 602 cause that text input instruction to be executed in that application 612 (e.g., a text input into the particular cell of the spreadsheet). The results of the execution of that text input instruction in the application 612 are then provided by the source device 602 to the sink device 608 so that the display of the application 612 on the display screen 610*a* of the display device 610 is updated to reflect that executed text input instruction.

In another embodiment, the sink device 608 may operate to execute the input instructions directed to collaboration information displayed on the display device on a copy of the collaboration information that is included on the sink device 608. For example, the sink device 608 may identify a text modification instruction along with source device input element coordinates that indicate the location of the source device input element 1300 in the FIG. 13 (e.g., a particular cell of a spreadsheet), and may cause that text modification instruction to be executed in the copy of that application 612 that is stored on the sink device 608 (e.g., a text modification into the particular cell of the spreadsheet). The results of the execution of that text input instruction in the application 612 may then be provided by the sink device 608 to the source device 602 so that the application 612 provided on the source device 602 may be updated as well with the text modification instruction.

In another embodiment, the input instruction may be provided via the tunnel discussed above and to the source device 602 so that the source device 602 may execute the input instruction. The source device 602 may then send the result of the executed input instruction to the sink device 608 along with one or more graphics commands, and the sink device 608 may execute the graphics command(s) (e.g., using a graphics driver for the application 612) and utilize the result of the processed input instruction to cause the input instruction to be executed on the application 612 displayed on the display screen 610*a* of the display device 610. In an example, when an input element from the source device 604 "enters" collaboration information provided by the source device 602, a link may be activated between the source devices 602 and 604 (e.g., directly, through the sink device, etc.) to share that collaboration information. In some examples, when the input element of a source device engages collaboration information (or enters the display screen 610*a* of the display device 610), the sink device 608 may operate to pause the input elements of other source devices so that the input element from the unpaused source device is the only element available to provide an input instruction.

Thus, systems and methods have been described that allow for multi-user display collaboration via a shared display of collaboration information from one or more source devices that may be acted upon by any of those source devices. While each of the source devices discussed above have been described as co-located source devices (e.g., source devices in the same room or on the same local network), source devices in remote location (e.g., connected via the Internet) may participate similarly to the source devices discussed above while remaining within the scope of the present disclosure. Furthermore, while the systems and methods described above focus on defined source and sink devices, devices in the system may perform as either or both of source devices and sink devices in different embodiments. For example, the sink device 608 discussed above may act as a source device for a different sink device. As such, the multi-user display collaboration system enhances collaboration between a plurality of users, and may be utilized with storage subsystems to provide a persistent collaborative workspace where collaboration information may be stored, updated, annotated, and shared with other users, while tracking the progress of the collaboration information that can be acted on or viewed by any number of users simultaneously.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-user display collaboration system, comprising:
   a plurality of source devices that each include a respective source device display screen;
   a display device; and
   a sink device coupled to each of the plurality of source devices and the display device, wherein the sink device is configured to:
      receive, from a first source device of the plurality of source devices, first collaboration information that is stored on the first source device and displayed on a first source device display screen of the first source device;
      display the first collaboration information on the display device;
      receive, from a second source device of the plurality of source devices, a first input instruction that is directed to the first collaboration information displayed on the display device;
      cause the first input instruction to be executed on the first collaboration information that is displayed on the display device;
      receive, from the second source device of the plurality of source devices, second collaboration information that is stored on the second source device and displayed on a second source device display screen of the second source device;
      display the second collaboration information along with the first collaboration information on the display device;
      receive, from at least one of the plurality of source devices that is not the second source device, a second input instruction that is directed to the second collaboration information displayed on the display device; and
      cause the second input instruction to be executed on the second collaboration information that is displayed on the display device.

2. The system of claim 1, wherein the sink device is configured to:
   receive, from the second source device, a plurality of second source device input element coordinates that describe a position of a second source device input element relative to a display device screen that is provided on the display device and that includes the first collaboration information;
   provide, for display on the display device screen that includes the first collaboration information, the second source device input element according to the plurality of second source device input element coordinates; and
   receive, from the second source device, a second source device input action that provides the first input instruction.

3. The system of claim 1, wherein the first input instruction includes a save input instruction and the sink device is configured to:
   cause the first collaboration information to be copied to the second source device.

4. The system of claim 1, wherein the displaying the first collaboration information on the display device includes:
   receiving, from the first source device, a copy of the first collaboration information that is stored on the first source device;
   storing the copy of the first collaboration information on the sink device; and
   displaying the copy of the first collaboration information on the display device.

5. The system of claim 4, wherein the sink device causes the first input instruction to be executed on the first collaboration information that is displayed on the display device by executing the first input instruction on the copy of the first collaboration information that is stored on the sink device.

6. The system of claim 1, wherein the displaying the first collaboration information on the display device and causing the first input instruction to be executed on the first collaboration information that is displayed on the display device includes:
   creating a tunnel to the first source device;
   receiving, from the first source device via the tunnel, the first collaboration information;
   displaying the first collaboration information on the display device; and
   providing the first input instruction via the tunnel to the first source device such that the first source device executes the first input instruction on the first collaboration information stored on the first source device and causes a result of the executed first input instruction on the first collaboration information to be transmitted through the tunnel and displayed on the display device.

7. An information handling system (IHS), comprising:
   a display device connector;
   a processing system that is coupled to the display device connector; and
   a memory system that is coupled to the processing system and that includes instruction that, when executed by the processing system, cause the processing system to provide a display engine that is configured to:

receive, from a first source device, first collaboration information that is stored on the first source device and displayed on a first source device display screen of the first source device;

display the first collaboration information on a display device that is coupled to the display device connector;

receive, from a second source device, a first input instruction that is directed to the first collaboration information displayed on the display device; and cause the first input instruction to be executed on the first collaboration information that is displayed on the display device.

8. The IHS of claim 7, where in the display engine is configured to:

receive, from the second source device, second collaboration information that is stored on the second source device and displayed on a second source device display screen of the second source device;

display the second collaboration information along with the first collaboration information on the display device;

receive, from at least one source device that is not the second source device, a second input instruction that is directed to the second collaboration information displayed on the display device; and cause the second input instruction to be executed on the second collaboration information that is displayed on the display device.

9. The IHS of claim 7, wherein the display engine is configured to:

receive, from the second source device, a plurality of second source device input element coordinates that describe a position of a second source device input element relative to a display device screen that is provided on the display device and that includes the first collaboration information;

provide, for display on the display device screen that includes the first collaboration information, the second source device input element according to the plurality of second source device input element coordinates; and receive, from the second source device, a second source device input action that provides the first input instruction.

10. The IHS of claim 7, wherein the first input instruction includes a save input instruction and the display engine is configured to:

cause the first collaboration information to be copied to the second source device.

11. The IHS of claim 7, wherein the displaying the first collaboration information on the display device includes:

receiving, from the first source device, a copy of the first collaboration information that is stored on the first source device;

storing the copy of the first collaboration information in a storage system; and displaying the copy of the first collaboration information on the display device.

12. The IHS of claim 11, wherein the display engine causes the first input instruction to be executed on the first collaboration information that is displayed on the display device by executing the first input instruction on the copy of the first collaboration information that is stored on the storage system.

13. The IHS of claim 7, wherein the displaying the first collaboration information on the display device and causing the first input instruction to be executed on the first collaboration information that is displayed on the display device includes:

creating a tunnel to the first source device;

receiving, from the first source device via the tunnel, the first collaboration information;

displaying the first collaboration information on the display device; and providing the first input instruction via the tunnel to the first source device such that the first source device executes the first input instruction on the first collaboration information stored on the first source device and causes a result of the executed first input instruction on the first collaboration information to be transmitted through the tunnel and displayed on the display device.

14. A method for multi-user display collaboration, comprising:

receiving, by a sink device from a first source device, first collaboration information that is stored on the first source device and displayed on a first source device display screen of the first source device;

displaying, by the sink device on a display device, the first collaboration information;

receiving, by the sink device from a second source device, a first input instruction that is directed to the first collaboration information displayed on the display device; and causing, by the sink device, the first input instruction to be executed on the first collaboration information that is displayed on the display device;

receiving, by the sink device from the second source device, a plurality of second source device input element coordinates that describe a position of a second source device input element relative to a display device screen that is provided on the display device and that includes the first collaboration information;

providing, by the sink device for display on the display device screen that includes the first collaboration information, the second source device input element according to the plurality of second source device input element coordinates; and receiving, by the sink device from the second source device, a second source device input action that provides the first input instruction.

15. The method of claim 14, further comprising:

receiving, by the sink device from the second source device, second collaboration information that is stored on the second source device and displayed on a second source device display screen of the second source device;

displaying, by the sink device on the display device, the second collaboration information along with the first collaboration information;

receiving, by the sink device from at least one source device that is not the second source device, a second input instruction that is directed to the second collaboration information displayed on the display device; and causing, by the sink device, the second input instruction to be executed on the second collaboration information that is displayed on the display device.

16. The method of claim 14, wherein the first input instruction includes a save input instruction and the method further comprises:

causing, by the sink device, the first collaboration information to be copied to the second source device.

17. The method of claim 14, wherein the displaying the first collaboration information on the display device and causing the first input instruction to be executed on the first collaboration information that is displayed on the display device includes:

receiving, by the sink device from the first source device, a copy of the first collaboration information that is stored on the first source device;

storing, by the sink device, the copy of the first collaboration information in a storage system;

displaying, by the sink device on the display device, the copy of the first collaboration information; and executing, by the sink device, the first input instruction on the copy of the first collaboration information that is stored on the storage system.

18. The method of claim 14, wherein the displaying the first collaboration information on the display device and causing the first input instruction to be executed on the first collaboration information that is displayed on the display device includes:

creating, by the sink device, a tunnel to the first source device;

receiving, by the sink device from the first source device via the tunnel, the first collaboration information;

displaying, by the sink device on the display device, the first collaboration information; and providing, by the sink device, the first input instruction via the tunnel to the first source device such that the first source device executes the first input instruction on the first collaboration information stored on the first source device and causes a result of the executed first input instruction on the first collaboration information to be transmitted through the tunnel and displayed on the display device.

\* \* \* \* \*